US012234736B2

(12) United States Patent
Kim et al.

(10) Patent No.: US 12,234,736 B2
(45) Date of Patent: Feb. 25, 2025

(54) CLEARANCE DESIGN PROCESS AND STRATEGY WITH CCA-ACC OPTIMIZATION FOR EGT AND PERFORMANCE IMPROVEMENT

(71) Applicant: General Electric Company, Schenectady, NY (US)

(72) Inventors: Taehong Kim, West Chester, OH (US); Marcia Boyle Johnson, Clarksville, OH (US); Daniel E. Reisenauer, West Chester, OH (US)

(73) Assignee: General Electric Company, Evendale, OH (US)

( * ) Notice: Subject to any disclaimer, the term of this patent is extended or adjusted under 35 U.S.C. 154(b) by 7 days.

(21) Appl. No.: 18/209,805

(22) Filed: Jun. 14, 2023

(65) Prior Publication Data

US 2024/0084709 A1    Mar. 14, 2024

Related U.S. Application Data

(62) Division of application No. 17/151,474, filed on Jan. 18, 2021, now Pat. No. 11,713,689.

(51) Int. Cl.
*F01D 11/14*    (2006.01)
*F01D 11/10*    (2006.01)

(52) U.S. Cl.
CPC ............. *F01D 11/14* (2013.01); *F01D 11/10* (2013.01); *F05D 2220/32* (2013.01); *F05D 2270/20* (2013.01)

(58) Field of Classification Search
CPC .......... F01D 11/24; F01D 11/14; F01D 11/20; F05D 2270/112; F05D 2270/303;
(Continued)

(56) References Cited

U.S. PATENT DOCUMENTS 4,161,101 A * 7/1979 Drummond ............... F02C 9/28
60/773
4,856,272 A   8/1989 Putman et al.
(Continued)

FOREIGN PATENT DOCUMENTS

CN   105222616 A   1/2016
CN   107120146 A   9/2017
(Continued)

OTHER PUBLICATIONS

United States Patent and Trademark Office, "Notice of Allowance," issued in connection with U.S. Appl. No. 17/151,474, mailed on Mar. 15, 2023, 8 pages.
(Continued)

*Primary Examiner* — Juan G Flores
*Assistant Examiner* — Ryan C Clark
(74) *Attorney, Agent, or Firm* — Hanley, Flight & Zimmerman, LLC

(57) ABSTRACT

Methods, apparatus, systems and articles of manufacture are disclosed to illustrate a clearance design process and strategy with CCA-ACC optimization for exhaust gas temperature (EGT) and performance improvement. In some examples, an apparatus includes a case surrounding at least part of a turbine engine, the at least part of the turbine engine including a turbine or a compressor. The apparatus further includes a first source to obtain external air; a second source to obtain cooled cooling air; a heat exchanger to control temperature of cooled cooling air; and a case cooler to provide active clearance control air to the case to control deflection of the case, wherein the active clearance control air is a combination of the external air and the cooled cooling air, the case cooler coupled to the heat exchanger using a first valve, the first valve triggered by a first control signal.

13 Claims, 16 Drawing Sheets

(58) Field of Classification Search
CPC ......... F05D 2270/304; F05D 2270/309; F05D 2270/44; F05D 2240/11; F05D 2240/55; F05D 2220/323; F05D 2260/201
See application file for complete search history.

(56) References Cited

U.S. PATENT DOCUMENTS

| | | | |
|---|---|---|---|
| 4,928,240 A * | 5/1990 | Davison | F01D 11/24 60/806 |
| 5,399,066 A | 3/1995 | Ritchie et al. | |
| 6,401,460 B1 | 6/2002 | Xia | |
| 6,435,823 B1 | 8/2002 | Schroder | |
| 6,487,491 B1 * | 11/2002 | Karpman | G05B 17/02 415/117 |
| 8,210,801 B2 | 7/2012 | Ballard, Jr. et al. | |
| 9,255,492 B2 | 2/2016 | Bacic | |
| 9,909,441 B2 | 3/2018 | Schelfaut | |
| 10,294,811 B2 | 5/2019 | Morrill | |
| 10,323,535 B2 | 6/2019 | Davis et al. | |
| 10,822,991 B2 * | 11/2020 | Clarke | F01D 11/24 |
| 11,125,165 B2 | 9/2021 | Niergarth et al. | |
| 2005/0276690 A1 * | 12/2005 | Amiot | F02C 6/08 415/178 |
| 2008/0008593 A1 | 1/2008 | Zagar et al. | |
| 2009/0037035 A1 * | 2/2009 | Hershey | F02C 9/00 706/46 |
| 2012/0070266 A1 * | 3/2012 | Schaberg | F01D 21/12 415/1 |
| 2017/0122208 A1 * | 5/2017 | Kessler | F02C 9/18 |
| 2017/0130602 A1 * | 5/2017 | Schelfaut | F01D 11/24 |
| 2019/0024527 A1 | 1/2019 | Skertic et al. | |
| 2019/0078459 A1 * | 3/2019 | Eastwood | F01D 17/06 |
| 2019/0085710 A1 * | 3/2019 | van der Merwe | F01D 11/16 |
| 2019/0136708 A1 * | 5/2019 | Sebastian | F01D 25/243 |
| 2019/0242303 A1 | 8/2019 | Menheere et al. | |
| 2022/0228503 A1 | 7/2022 | Kim et al. | |

FOREIGN PATENT DOCUMENTS

| | | |
|---|---|---|
| EP | 3382156 A1 | 10/2018 |
| RU | 2738523 C1 | 12/2020 |

OTHER PUBLICATIONS

United States Patent and Trademark Office, "Non-Final office action," issued in connection with U.S. Appl. No. 17/151,474, mailed on Oct. 3, 2022, 7 pages.

United States Patent and Trademark Office, "Restriction Requirement," issued in connection with U.S. Appl. No. 17/151,474, mailed on Jun. 16, 2022, 7 pages.

China National Intellectual Property Administration, "First Office Action and First Search," issued in connection with Chinese Patent Application No. 202210046362.9, dated Jun. 21, 2024, 12 pages.

* cited by examiner

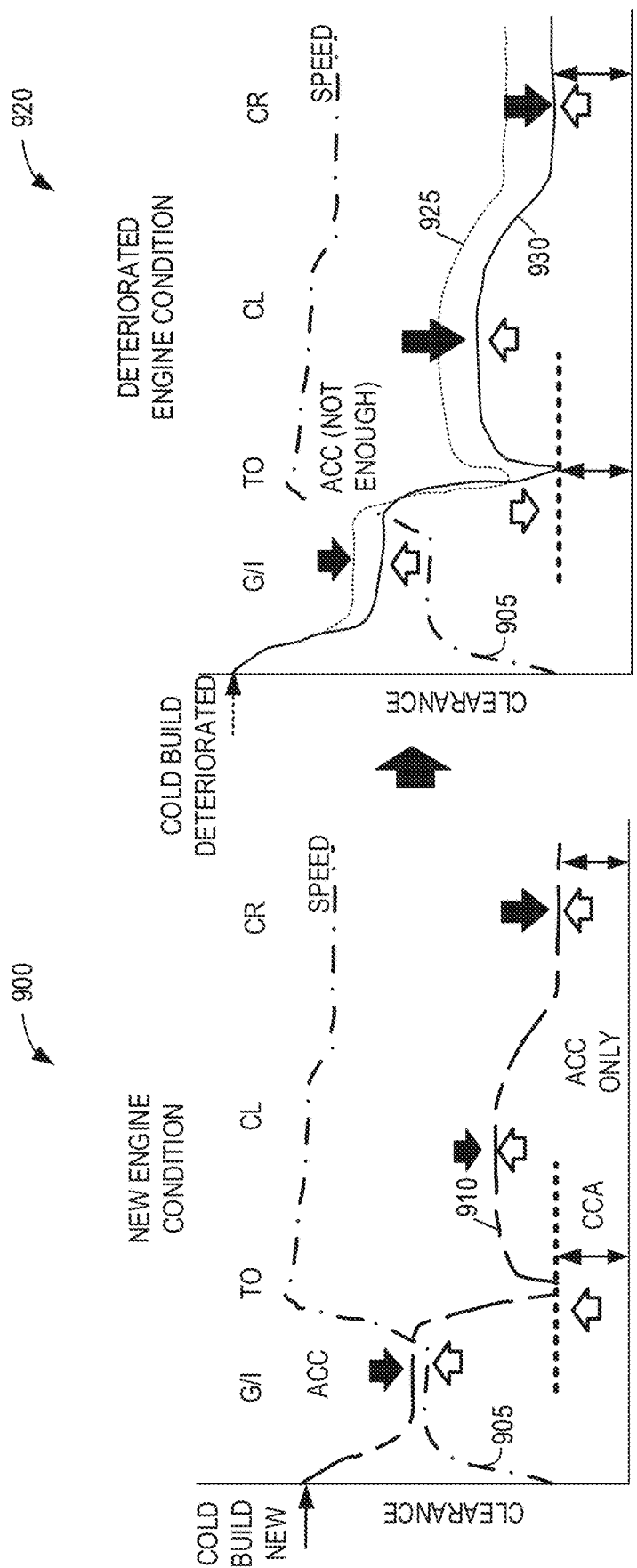

CLEARANCE DESIGN PROCESS AND STRATEGY WITH CCA-ACC OPTIMIZATION FOR EGT AND PERFORMANCE IMPROVEMENT

RELATED APPLICATIONS

This patent arises from a divisional of U.S. patent application Ser. No. 17/151,474 (now U.S. Pat. No. 11,713,689), which was filed on Jan. 18, 2021. U.S. patent application Ser. No. 17/151,474 is hereby incorporated herein by reference in it entirety Priority to U.S. patent application Ser. No. 17/151,474, is hereby claimed.

FIELD OF THE DISCLOSURE

This disclosure relates generally to a gas turbine engine, and, more particularly, to a clearance design process and strategy with cooled cooling air (CCA) and active clearance control (ACC) optimization for exhaust gas temperature (EGT) and performance improvement.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In general, it is desirable for a gas turbine engine to maintain clearance between the tip of a blade in the gas turbine engine and the stationary parts of the gas turbine engine (e.g., the gas turbine engine casing, stator, etc.). During operation, the gas turbine engine is exposed to thermal (e.g., hot and cold air pumped into the gas turbine engine, etc.) and mechanical loads (e.g., centrifugal force on the blades on the gas turbine engine, etc.), which can expand and contract the gas turbine engine casing and rotor. The expansion and contraction of the gas turbine engine casing can change the clearance between the blade tip and the stationary parts of the gas turbine engine. There is a continuing need to control clearance between the blade tip and the engine casing that fluctuates during normal operation for a gas turbine engine to achieve tighter clearance for the better performance and avoid damage to the gas turbine engine (e.g., wear, breakage, etc.).

BRIEF SUMMARY

Methods, apparatus, systems, and articles of manufacture for a clearance design process and strategy with CCA and ACC optimization for EGT and performance improvement are disclosed.

Certain examples provide an apparatus including a case surrounding at least part of the turbine engine, the at least part of the turbine engine including a turbine or a compressor; a first compressor to obtain external air; a second compressor to obtain cooled cooling air; a heat exchanger to control a temperature of the cooled cooling air provided by the second compressor, the heat exchanger triggered by a first control signal; and a case cooler to provide active clearance control air to the case to control deflection of the case, wherein the active clearance control air is a combination of the external air from the first compressor and the cooled cooling air, the case cooler coupled to the heat exchanger using a first valve, the first valve triggered by a second control signal.

Certain examples provide an apparatus including a case surrounding at least part of the turbine engine, the at least part of the turbine engine including a turbine or a compressor; a first compressor to obtain external air; a second compressor to obtain cooled cooling air; a mixer to generate thermally mixed air by mixing the external air provided by the first compressor and the cooled cooling air provided by the second compressor, the mixer to regulate a temperature of the thermally mixed air, the mixer triggered by a first control signal; and a case cooler to provide the thermally mixed air from the mixer to the case to control deflection of the case, the case cooler coupled to the mixer using a first valve, the first valve triggered by a second control signal.

Certain examples provide a non-transitory computer readable medium comprising instructions that, when executed, cause at least one processor to at least obtain condition parameters from sensor devices in a turbine engine; monitor the condition parameters; determine when conditions indicate an increase in temperature or a decrease in clearance between a blade tip and a case, the case surrounding at least part of the turbine engine; in response to determining that the conditions indicate an increase in temperature or a decrease in clearance between the blade tip and the case: transmit a first control signal to adjust a flow rate of a valve to increase airflow; and transmit a second control signal to adjust temperature of airflow through the at least part of the turbine engine.

Certain examples provide an engine controller including a memory; and a processor coupled to the memory, the memory including instructions that, when executed, cause the processor to at least: obtain condition parameters from sensor devices in a turbine engine; monitor the condition parameters; determine when conditions indicate an increase in temperature or a decrease in clearance between a blade tip and a case, the case surrounding at least part of the turbine engine; in response to determining that the conditions indicate an increase in temperature or a decrease in clearance between the blade tip and the case: transmit a first control signal to adjust a flow rate of a valve to increase airflow; and transmit a second control signal to adjust temperature of airflow through the at least part of the turbine engine.

BRIEF DESCRIPTION OF THE DRAWINGS

FIGS. 9A, 9B are example graph representations of clearances for the example CCA-ACC system of FIGS. 4, 5.

Figure 1:
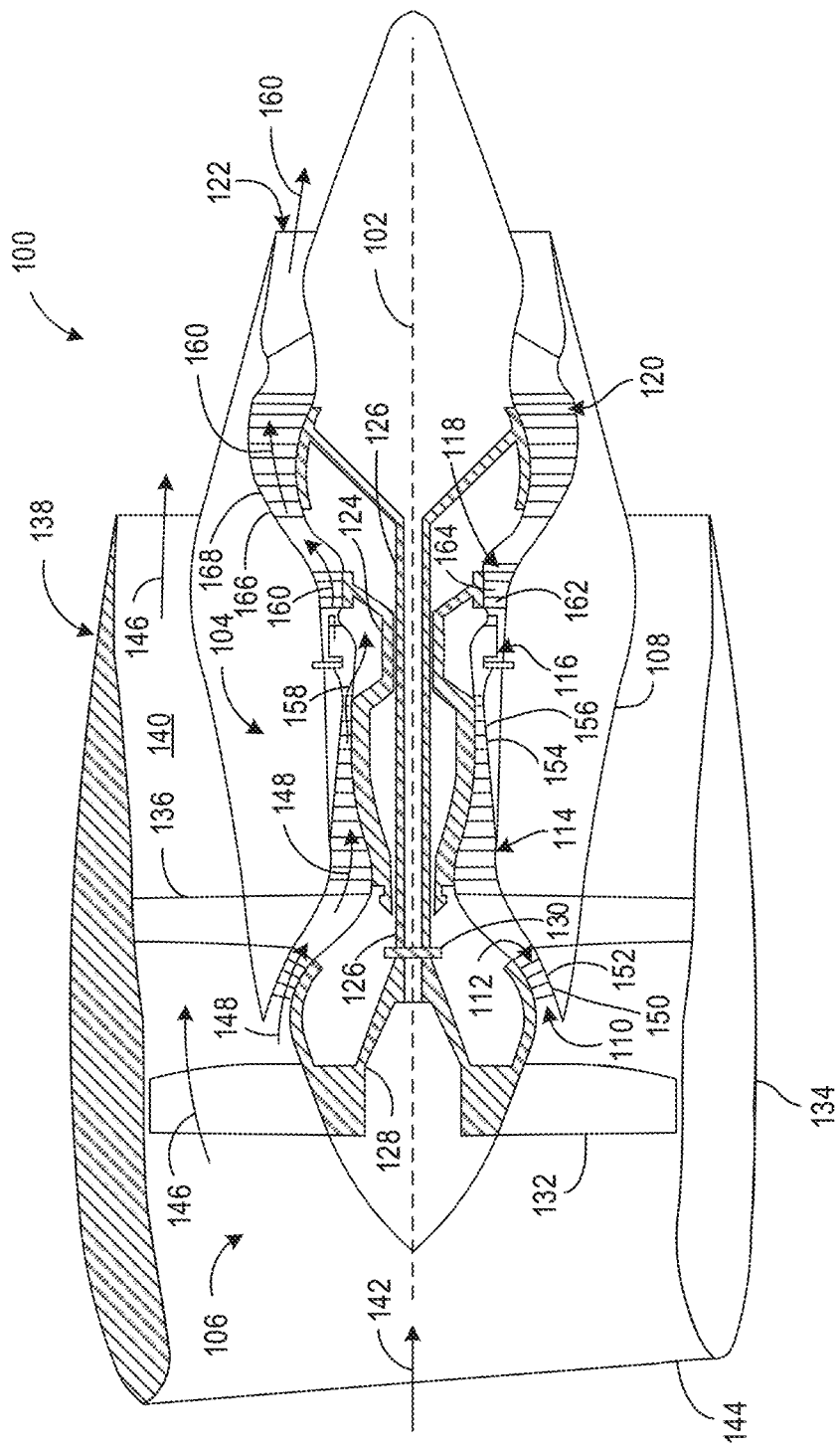
FIG. 1 is a schematic cross-sectional view of an example gas turbine engine in accordance with the teachings disclosed herein.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the gas turbine engine 100. As used herein, "lateral" refers to the direction perpendicular to the axial and vertical directions (e.g., into and out of the plane of FIGS. 1, 2, etc.).

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.).

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. A turbine engine also includes a turbine with an intricate array of alternating rotating and stationary airfoil-section blades. As the hot combustion gas passes through the turbine, the hot combustion gas expands, causing the rotating blades to spin.

The components of the turbine engine (e.g., the fan, the booster compressor, the high-pressure compressor, the high-pressure turbine, the low-pressure turbine, etc.) can degrade over time due to demanding operating conditions such as extreme temperature and vibration. During operation, the turbine engine components are exposed to thermal (e.g., hot and cold air pumped into the turbine engine, etc.) and mechanical loads (e.g., centrifugal force on the blades on the turbine engine, etc.), which can expand and contract the turbine engine casing and rotor and/or compressor casing and rotor along with other components of the turbine engine and/or its compressor. The expansion and contraction of the turbine engine casing and/or compressor casing can change the clearance between the blades' tips and the stationary components of the turbine engine. In some examples, if the clearance between the blades' tips and the stationary components is not controlled, then the blades' tips and stationary components can collide during operation and lead to further degradation of the components of the turbine engine.

The Active Clearance Control (ACC) system optimizes or otherwise improves blade tip clearance for engine performance improvement without unexpected harmful rub events during flight and ground operations. A conventional ACC system includes using cooling air from a fan or compressor to control the clearance between the blade tip and an engine component that has shrunk (e.g., the stator, the case, etc.). The conventional ACC system is controlled by a controller (e.g., a full authority digital engine (or electronics) control (FADEC)) to modulate the clearance in one direction (e.g., engine component shrinkage). The conventional ACC system provides cooling air from a fan or compressor to the surface of stator of a turbine and/or compressor (e.g., the high-pressure compressor, the high-pressure turbine, the low-pressure turbine, the low-pressure compressor, etc.) for case deflection and clearance control. However, the conventional ACC system does not provide sufficient clearance control in deteriorated engine conditions because the clearance is too large to be able to control the exhaust gas temperature (EGT) of the turbine engine (e.g., a deteriorated engine condition with blade tip loss (due to oxidation) opens a clearance beyond the range of ACC capability to adjust).

Similarly, a Passive Clearance Control (PCC) system modulates clearance for case deflection by material selection and design optimization of the stator of a turbine and/or compressor. However, a PCC system is not controlled by a controller (e.g., a FADEC). The conventional PCC system does not work appropriately for operational and/or performance design points (e.g., take-off, cruise, climb, etc.) since it is not modulated by a controller to determine when clearance control needs to be taken as an ACC system does.

A Cooled Cooling Air (CCA) system provides additional blade tip clearance to achieve performance improvement with better capability of clearance control for altitude cruise point through the flight mission and reduce/prevent harmful rub events during flight and ground operations for a turbine engine. A conventional CCA system applies cooled cooling air from a fan or a compressor to the rotating parts of the turbine engine (e.g., blades, disks, seals, etc.) to change the deflection and blade tip clearance. A conventional CCA provides appropriate clearance control by controlling rotor deflection to control EGT overshoot.

Examples disclosed herein integrate an CCA-ACC system to control blade clearance in a turbine engine. Examples disclosed herein include a new clearance design strategy for controlling blade clearance, regulating EGT, and improving time-on-wing for a turbine engine compared to an ACC system and for a compressor compared to a PCC system with a separated CCA application. In examples disclosed herein, the CCA and ACC systems work together to control clearance at the case of a turbine and/or compressor and at the rotating parts within the turbine and/or compressor. The integration of the CCA system with the ACC system increases the range of clearance movement and improves the capability of EGT control in the case of deteriorated blades/shrouds of the turbine and/or compressor. Examples disclosed herein integrate the CCA and ACC systems using a heat exchanger and/or a mixer to provide an exchange of cooling air between the systems. Introducing the heat exchanger or mixer between the CCA and ACC systems provides additional, more effective clearance control (e.g., additional power, airflow, cooling temperature adjustment, clearance precision, etc.), which can improve control of EGT overshoot. In examples disclosed herein, the integration of the CCA system also provides appropriate clearance control for the ACC system by achieving tighter clearance and improving specific fuel consumption (SFC) for the turbine engine at cruise and other points in the flight mission. Furthermore, the addition of the CCA system into the ACC system increases performance of cooling down parts in the hot section of the turbine engine (e.g., turbine, compressor, rotating parts, etc.) more effectively than current airfoil cooling designs. Examples disclosed herein provide increased hardware endurance capability and life improvement for the components of the turbine engine due to the colder air of the CCA system.

Certain examples provide an engine controller, referred to as a full authority digital engine (or electronics) control (FADEC). The FADEC includes a digital computer, referred to as an electronic engine controller (EEC) or engine control unit (ECU), and related accessories that control aspects of aircraft engine performance. The FADEC can be used with a variety of engines such as piston engines, jet engines, other aircraft engines, etc. In certain examples, the EEC/ECU is provided separate from the FADEC, allowing manual override or intervention by a pilot and/or other operator.

In examples disclosed herein, the engine controller receives values for a plurality of input variables relating to flight condition (e.g., air density, throttle lever position, engine temperatures, engine pressures, etc.). The engine controller computes engine operating parameters such as fuel flow, stator vane position, air bleed valve position, etc., using the flight condition data. The engine operating parameters can be used by the engine controller to control operation of the CCA-ACC system to modulate blade tip clearance in the turbine engine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
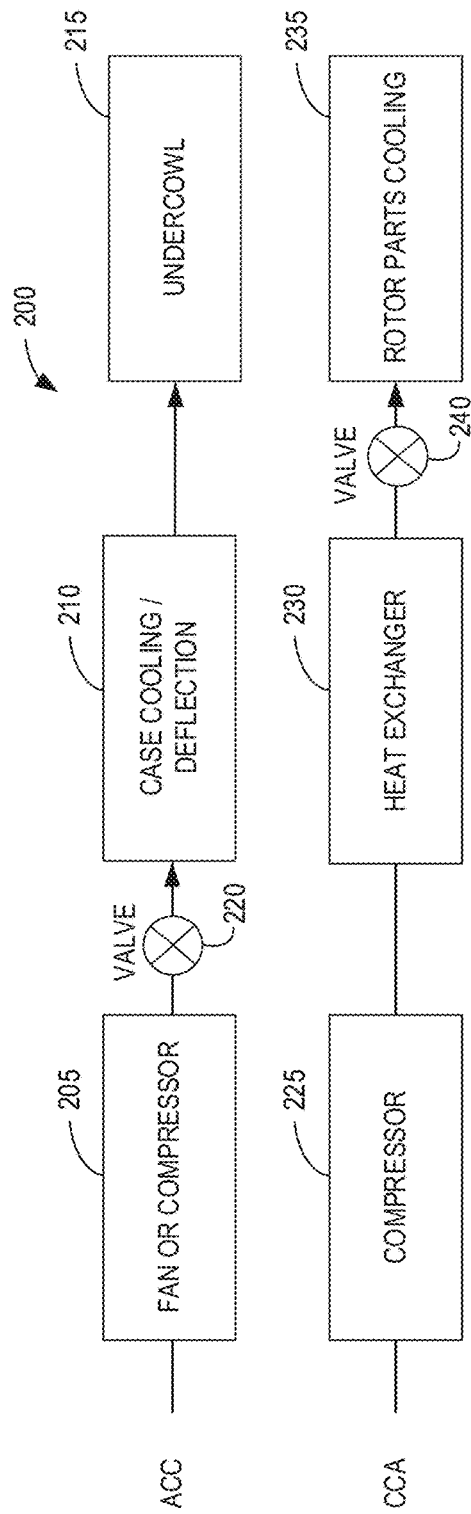
FIGS. 2A, 2B are block diagrams of example prior active clearance control (ACC) and cooled cooling air (CCA) systems.

FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending there through for reference. In general, the turbofan 100 includes a core turbine or gas turbine engine 104 disposed downstream from a fan section 106.

The core turbine 104 includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106. In some examples, the LP shaft 126 may couple directly to the fan shaft 128 (i.e., a direct-drive configuration). In alternative configurations, the LP shaft 126 may couple to the fan shaft 128 via a reduction gear 130 (i.e., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass flow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106.

FIGS. 2A, 2B are block diagrams of example prior active clearance control (ACC) and cooled cooling air (CCA) systems. The prior ACC and CCA system 200 of FIG. 2A includes a fan or compressor 205, a case cooling/deflection 210, an undercowl 215, and a valve 220 for the ACC system, and a compressor 225, a heat exchanger 230, a rotor parts cooling 235, and a valve 240 for the CCA system. In the illustrated example of FIG. 2A, the ACC and CCA systems and the respective components are separated (e.g., not integrated to work together). In the ACC system of the prior system 200, the fan or compressor 205 obtains external jet air for cooling. The fan or compressor 205 provides the external jet air to the case cooling/deflection 210 through the valve 220. In some examples, the valve 220 position is controlled to allow for the external jet air to flow from the fan or compressor 205 to the case cooling/deflection 210. In some examples, the valve 220 is controlled by a controller (e.g., a full-authority digital engine control (FADEC) unit, an engine control unit (ECU), an electronic engine control (EEC) unit, etc.), where the controller controls the valve 220 position to control the clearance. For example, the controller controls the valve 220 position between 0% (fully closed) and 100% (fully open) (e.g., the valve 220 position can be at 40% open, 80% open, etc.). The case cooling/deflection 210 applies the external jet air from the fan or compressor 205 to the case of the turbine (e.g., the HP turbine 118 or the LP turbine 120 of FIG. 1) and/or compressor (e.g., the LP compressor 112 or the high HP compressor 114 of FIG. 1). The case cooling/deflection 210 applies the external jet air to the case to adjust the clearance between the case of the turbine and/or compressor and the internal parts (e.g., rotor parts). The case cooling/deflection 210 directs the external jet air from the fan or compressor 205 to the undercowl 215 after the case cooling/deflection 210 uses the external jet air for case cooling and case deflection. The case cooling/deflection 210 directs the used external jet air to the undercowl 215 for other thermal environments to be cooled. In some examples, the undercowl 215 is a covering on the turbine and/or compressor. The case cooling/deflection 210 can direct the external jet air to the undercowl 215 to discard the used external jet air or to apply the cooling from the external jet air to other surfaces of thermal environments of the turbine and/or compressor to decrease the clearance for the turbine engine (e.g., gas turbine engine 100 of FIG. 1).

In the illustrated example of FIG. 2A, the CCA system of the prior system 200 includes the compressor 225 to obtain cooled cooling air for cooling. The compressor 225 provides the cooled cooling air to the heat exchanger 230. The heat exchanger 230 adjusts the temperature of the cooled cooling air. The heat exchanger 230 provides the cooled cooling air to the rotor parts cooling 235 through the valve 240. In some examples, the valve 240 position is controlled to allow for the cooled cooling air to flow from the heat exchanger 230 to the rotor parts cooling 235. In some examples, the valve 240 is controlled by a controller (e.g., a full-authority digital engine control (FADEC) unit, an engine control unit (ECU), an electronic engine control (EEC) unit, etc.), where the controller controls the valve 240 position to control the clearance. For example, the controller controls the valve 240 position between 0% (fully closed) and 100% (fully open) (e.g., the valve 240 position can be at 40% open, 80% open, etc.). Alternatively, the controller controls the valve 240 position to be either 0% (fully closed) or 100% (fully open) for a simple and cost-effective design. The rotor parts cooling 235 applies the cooled cooling air from the heat exchanger 230 to the rotor parts of the turbine (e.g., the HP turbine 118 or the LP turbine 120 of FIG. 1) and/or compressor (e.g., the LP compressor 112 or the high HP compressor 114 of FIG. 1). The rotor parts cooling 235 applies the cooled cooling air to the rotor parts (e.g., blades, disks, etc.) inside the turbine and/or compressor to adjust the deflection of the rotor parts and control the clearance between the rotor parts and the case of the turbine and/or compressor.

The prior ACC and CCA system 250 of FIG. 2B includes first part 255 in place of the fan or compressor 205, the case cooling/deflection 210, a second part 260 in place of the undercowl 215, and the valve 220 for the ACC system, and the compressor 225, the heat exchanger 230, the rotor parts cooling 235, and the valve 240 for the CCA system. In the illustrated example of FIG. 2B, the ACC and CCA systems and the respective components are separated (e.g., not integrated to work together). The prior system 250 is similar to the prior system 200 of FIG. 2A, except the ACC system of prior system 250 includes the first part 255 and the second part 260. In some examples, the prior system 250 does not define the first part 255 and second part 260 of the ACC system because the components in those places can be replaced without impacting the prior system 250. The first part 255 could be a fan or a compressor similar to the fan or compressor 205 of prior system 200, however, other components may alternatively be included in the first part 255. Similarly, the second part 260 could be an undercowl similar to the undercowl 215 of the prior system 200, however, other components may alternatively be included in the second part 260. The prior systems 200 and 250 of FIGS. 2A and 2B respectively operate similarly in that the ACC and CCA systems are separate systems that provide clearance control in different places of the turbine and/or compressor (e.g., the ACC system providing clearance control on the surface of the case and the CCA system providing separate clearance control at the rotor parts).

Figure 3:
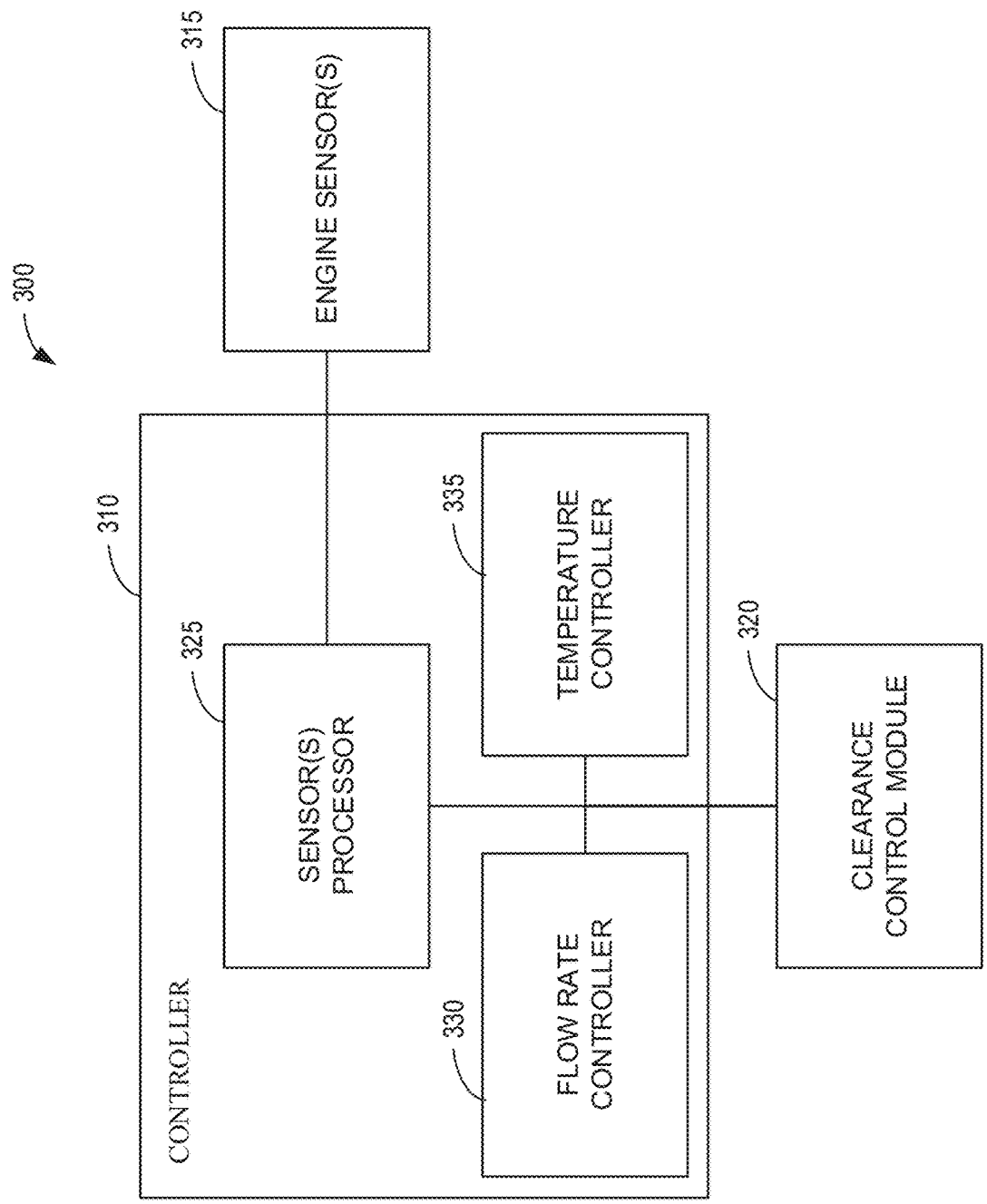
FIG. 3 is a block diagram of an example controller of an example CCA-ACC system in accordance with the embodiments disclosed herein.

FIG. 3 is a block diagram of an example controller 310 for an example CCA-ACC system in accordance with the teachings disclosed herein. In the example environment 300 of the illustrated example of FIG. 3, the controller 310 can be a full-authority digital engine control (FADEC) unit, an engine control unit (ECU), an electronic engine control (EEC) unit, etc., or any other type of data acquisition and/or control computing device, processor platform (e.g., processor-based computing platform), etc. The controller 310 communicates with the engine sensor(s) 315 and the clearance control module 320. The controller 310 includes a sensor(s) processor 325, a flow rate controller 330, and a temperature controller 335.

In the illustrated example of FIG. 3, the controller 310 receives values for a plurality of input variables relating to flight condition (e.g., air density, throttle lever position, engine temperatures, engine pressures, etc.). The controller 310 receives the flight condition data from the engine sensor(s) 315. The engine sensor(s) 315 can be mounted on the gas turbine engine 100 and/or positioned elsewhere in the aircraft (e.g., on wing, in cockpit, in main cabin, in engine compartment, in cargo, etc.). The communication between the controller 310 and the engine sensor(s) 315 can be one-way communication and/or two-way communication, for example. The controller 310 computes engine operating parameters such as fuel flow, stator vane position, air bleed valve position, etc., using the flight condition data.

In the illustrated example of FIG. 3, the sensor(s) processor 325 obtains the sensor data from the example engine sensor(s) 315. The sensor data includes the flight condition data obtained from the gas turbine engine 100. The sensor(s) processor 325 monitors engine conditions based on the sensor data from the engine sensor(s) 315. For example, the sensor(s) processor 325 can calculate and monitor the fuel flow, stator vane position, air bleed valve position, direct clearance measurements, indirect clearance measurements, etc. In some examples, the sensor(s) processor 325 compares the engine conditions to known model estimates for those conditions to monitor the engine conditions for any changes. In some examples, the sensor(s) processor 325 determines if the clearance between the case and the rotating parts of the gas turbine engine 100 is decreasing and/or if there is exhaust gas temperature overshoot based on the engine conditions determined from the obtained flight condition data. In the illustrated example of FIG. 3, the flow rate controller 330 transmits flow rate control signals to different valves in the CCA-ACC system (e.g., the CCA-ACC system 400 of FIG. 4 and/or the CCA-ACC system 500 of FIG. 5 described in further detail below). In some examples, the flow rate control signals from the flow rate controller 330 adjust the airflow rate through valves in the CCA-ACC system based on the results from sensor(s) processor 325. In the illustrated example of FIG. 3, the temperature controller 335 transmits a temperature control signal to a heat exchanger and/or mixer in the CCA-ACC system (e.g., the CCA-ACC system 400 of FIG. 4 and/or the CCA-ACC system 500 of FIG. 5 described in further detail below). In some examples, the temperature control signal from the temperature controller 335 adjusts the temperature of the air in the CCA-ACC system based on the results from sensor(s) processor 325.

Figure 4:
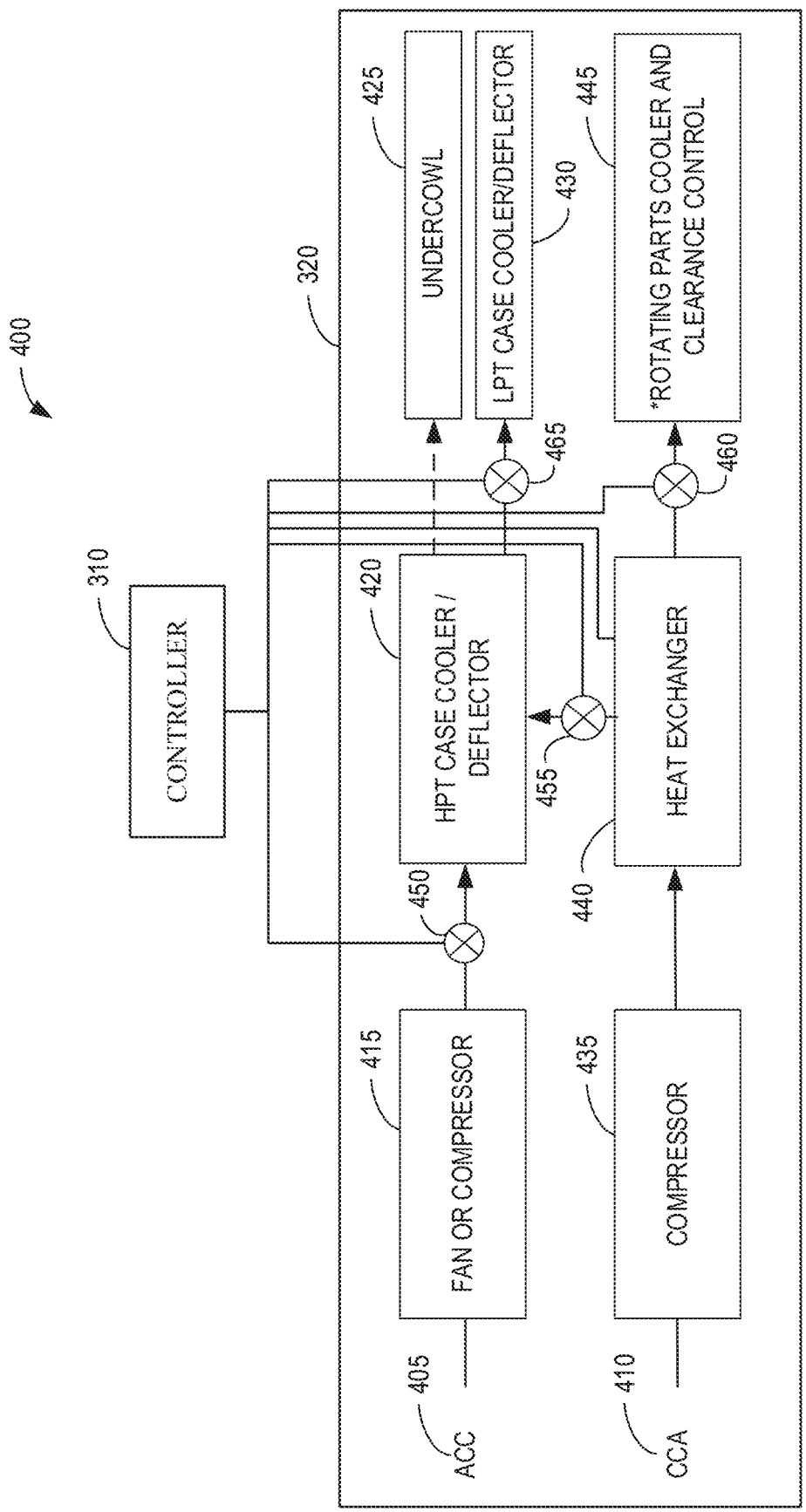
FIG. 4 is a block diagram of an example CCA-ACC system in accordance with teachings disclosed herein.

FIG. 4 is a block diagram of an example CCA-ACC system 400 in accordance with teachings disclosed herein. The CCA-ACC system 400 includes the controller 310 and the clearance control module 320 of FIG. 3. The clearance control module 320 of FIG. 4 includes an integrated ACC and CCA system. The clearance control module 320 includes an ACC system 405 and a CCA system 410. The ACC system 405 includes a fan or compressor 415, a HPT case cooler/deflector 420 (e.g., the HP turbine 118 case), an undercowl 425, and a low pressure turbine (LPT) case cooler/deflector 430. CCA system 410 includes a compressor 435, a heat exchanger 440, and rotating parts cooler and clearance control 445. The clearance control module 320 includes valves 450, 455, 460, and 465 to integrate the components of the ACC system 405 and the CCA system 410. In the illustrated example of FIG. 4, the CCA-ACC system 400 is one element in a series of elements for the clearance control in the gas turbine engine 100 of FIG. 1.

In the illustrated example of FIG. 4, the ACC system 405 includes the fan or compressor 415 to obtain external jet air for cooling. In some examples, the external jet air from the fan or compressor 415 is referred to as active clearance control air because the air is the external jet air obtained by the ACC system 405 of FIG. 4. The fan or compressor 415 provides the external jet air to the HPT case cooler/deflector 420 (e.g., the HP turbine 118 case) through the valve 450. In some examples, the fan or compressor 415 and the HPT case cooler/deflector 420 are connected through the valve 450. In some examples, the valve 450 opens and closes to allow for the external jet air to flow from the fan or compressor 415 to the HPT case cooler/deflector 420. The valve 450 is controlled by the controller 310, where the controller 310 opens and closes the valve 450 for different positions to control the airflow of the external jet air. The HPT case cooler/deflector 420 receives the external jet air from the fan or compressor 415 and obtains the external jet air for cooling the case of the turbine (e.g., the HP turbine 118 or the LP turbine 120 of FIG. 1) and/or compressor (e.g., the LP compressor 112 or the high HP compressor 114 of FIG. 1). The HPT case cooler/deflector 420 directs the external jet air to the undercowl 425 and the low pressure turbine (LPT) case cooler/deflector 430.

In some examples, the undercowl 425 is a covering on the turbine and/or compressor. The HPT case cooler/deflector 420 directs the external jet air to the undercowl 425 to apply the cooling from the external jet air to the surfaces of the cases of the turbine and/or compressor to cool the case and decrease the clearance for the turbine engine (e.g., gas turbine engine 100 of FIG. 1). In some examples, the LPT case cooler/deflector 430 directly applies the cooling from the external jet air to the surface of the LPT case (e.g., the case of the LP turbine 120 of FIG. 1). The HPT case cooler/deflector 420 is connected to the LPT case cooler/deflector 430 through the valve 465. The HPT case cooler/deflector 420 directs the external jet air to the LPT case cooler/deflector 430 through the valve 465.

In some examples, the valve 465 opens and closes to allow for the external jet air to flow from the HPT case cooler/deflector 420 directly to the LPT case cooler/deflector 430. The valve 465 is controlled by the controller 310, where the controller 310 opens and closes the valve 465 to control the airflow of the external jet air directly to the LPT case cooler/deflector 430. In the illustrated example of FIG. 4, the HPT case cooler/deflector 420 can direct airflow to both the undercowl 425 and the LPT case cooler/deflector 430, or the HPT case cooler/deflector 420 can increase and decrease airflow to the LPT case cooler/deflector 430 directly with the valve 465 to better control clearance when the clearance is decreasing or when the engine detects EGT overshoot.

In the illustrated example of FIG. 4, the CCA system 410 includes the compressor 435 to obtain the cooled cooling air. The compressor 435 provides the cooled cooling air to the heat exchanger 440. The heat exchanger 440 adjusts the temperature of the cooled cooling air. In some examples, the heat exchanger 440 adjusts the temperature of the cooled cooling air based on a temperature control signal from the controller 310. In some examples, the heat exchanger 440 is connected to the rotating parts cooler and clearance control 445 (e.g., the aft stages of HP compressor for CCA) via the valve 460. The heat exchanger 440 provides the cooled cooling air to the rotating parts cooler and clearance control 445 through the valve 460. In some examples, the valve 460 opens and closes to allow for the cooled cooling air to flow from the heat exchanger 440 to the rotating parts cooler and clearance control 445. In some examples, the valve 460 is controlled by the controller 310, and the controller 310 opens and closes the valve 460 to control the clearance through changing the flow rate of the cooled cooling air through the valve 460.

The rotating parts cooler and clearance control 445 applies the cooled cooling air from the heat exchanger 440 to the rotating parts of the turbine (e.g., the HP turbine 118 or the LP turbine 120 of FIG. 1) and/or compressor (e.g., the LP compressor 112 or the high HP compressor 114 of FIG. 1). The rotating parts cooler and clearance control 445 applies the cooled cooling air to the rotating parts (e.g., blades, disks, etc.) inside the turbine and/or compressor to adjust the deflection of the rotating parts and control the clearance between the rotating parts and the case of the turbine and/or compressor.

In the illustrated example of FIG. 4, the ACC system 405 and CCA system 410 are integrated. The HPT case cooler/deflector 420 of the ACC system 405 and the heat exchanger 440 of the CCA system 410 are connected via the valve 455. In the illustrated example of FIG. 4, the ACC system 405 and the CCA system 410 obtain air from separate sources (e.g., the fan or compressor 415 and the compressor 435 respectively). The controller 310 of FIG. 4 controls the mixing of the air between the ACC system 405 and CCA system 410 through the valve 455. The controller 310 opens the valve 455 and adjust the flow rate through the valve 455 using a flow rate control signal to allow the heat exchanger 440 to adjust the temperature of the cooled cooling air in the HPT case cooler/deflector 420 of the ACC system 405. The heat exchanger 440 controls the temperature of the air for both the ACC system 405 and CCA system 410 of the clearance control module 320 when the controller 310 has the valve 455 open. In some examples, the HPT case cooler/deflector 420 provides cooled cooling air controlled by the heat exchanger 440 to the undercowl 425 and/or reuses the cooled cooling air for the LPT case cooler/deflector 430. In some examples, the heat exchanger 440 directs the cooled cooling air directly to the LPT case cooler/deflector 430. The valves 455, 460 allow the clearance control module 320 to achieve tight clearance for the gas turbine engine 100 by integrating the ACC system 405 and CCA system 410. In the case of EGT overshoot, the controller 310 can increase the flow rate of the valve 455 to control the temperature of the air in the HPT case cooler/deflector 420 to provide the necessary clearance control from the CCA system 410 to the ACC system 405. In some examples, the ACC system 405 and CCA system 410 are implemented in a turbine (e.g., the HP turbine 118 and/or the LP turbine 120 of FIG. 1.). However, in some examples, a compressor (e.g., the LP compressor 112 and/or the HP compressor 114 of FIG. 1) does not include an ACC system (e.g., the ACC system 405). Instead, the compressor includes a PCC system to control clearance, rather than the ACC system, where the PCC system is not controlled by the controller 310. In such examples, the CCA system 410 is implemented with a PCC system in the compressor (e.g., the LP compressor 112 and/or the HP compressor 114 of FIG. 1).

Figure 5:
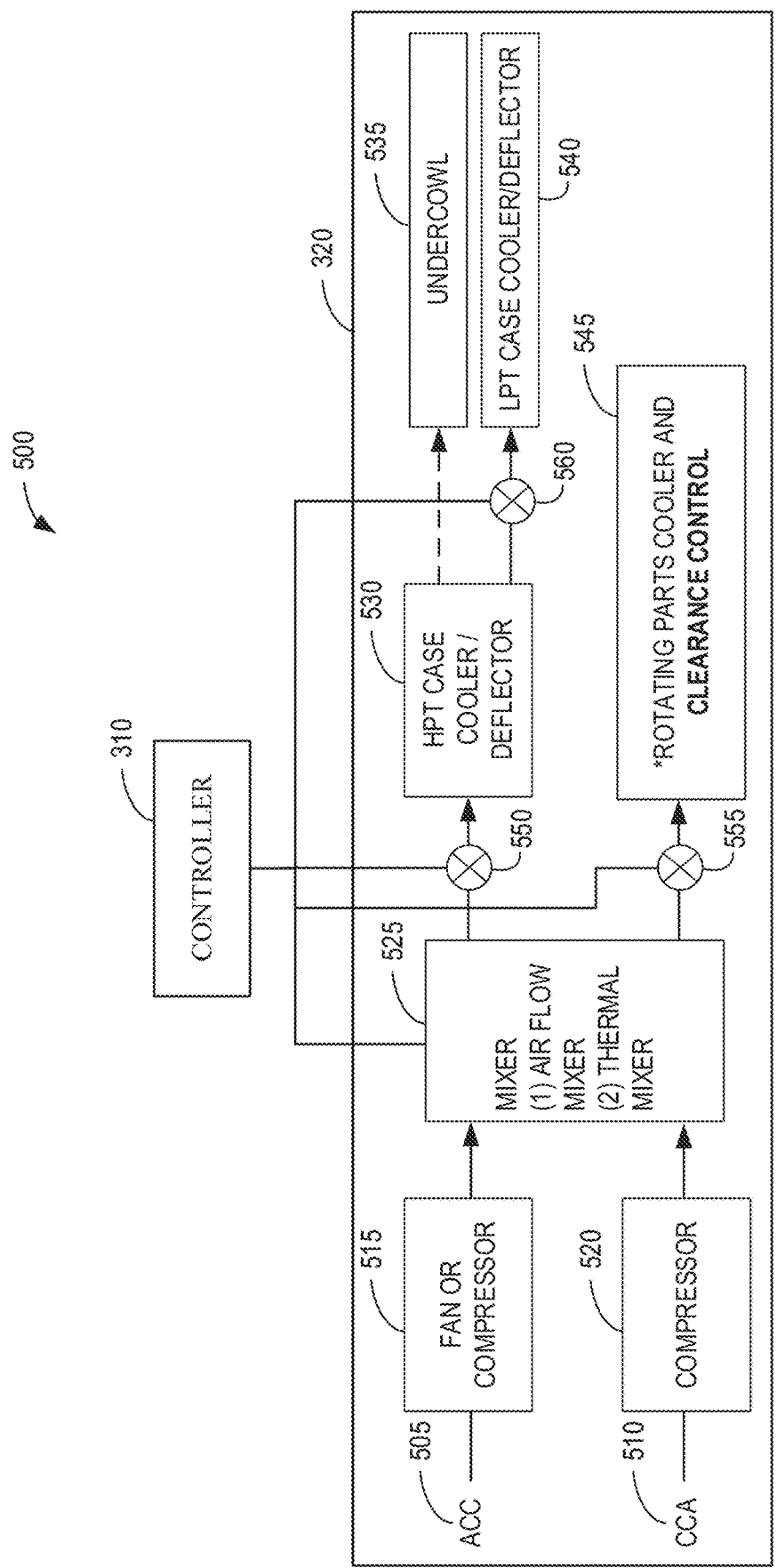
FIG. 5 is a block diagram of an alternative example CCA-ACC system in accordance with teachings disclosed herein.

FIG. 5 is a block diagram of an example CCA-ACC system 500 in accordance with teachings disclosed herein. The CCA-ACC system 500 includes the controller 310 and the clearance control module 320 of FIG. 3. The clearance control module 320 of FIG. 5 includes an integrated ACC and CCA system 500. The clearance control module 320 includes an ACC system 505 and a CCA system 510. The ACC system 505 includes a fan or compressor 515, a mixer 525, a HPT case cooler/deflector 530 (e.g., the HP turbine 118 case), an undercowl 535, and a low pressure turbine (LPT) case cooler/deflector 540. The CCA system 510 includes a compressor 520, the mixer 525, and rotating parts cooler and clearance control 545. The clearance control module 320 includes valves 550, 555, and 560 to integrate the components of the ACC system 505 and the CCA system 510. In the illustrated example of FIG. 5, the CCA-ACC system 500 is one element in a series of elements for the clearance control in the gas turbine engine 100 of FIG. 1.

In the illustrated example of FIG. 5, the ACC system 505 includes the fan or compressor 515 to obtain external jet air for cooling. In some examples, the external jet air from the fan or compressor 515 is referred to as active clearance control air because the air is the external jet air obtained by the ACC system 505 of FIG. 5. In the illustrated example, the CCA system 510 includes the compressor 520 to obtain cooled cooling air. The fan or compressor 515 of the ACC system 505 and the compressor 520 of the CCA system 510 provide the respective external jet air and cooled cooling air to the mixer 525. The ACC system 505 and the CCA system 510 of the clearance control module 320 share the mixer 525 for generating cooling air for clearance control. The mixer 525 includes an air flow mixer and/or a thermal mixer (e.g., a heat exchanger). The mixer 525 combines the external jet air from the fan or compressor 515 and the cooled cooling air from the compressor 520 to form mixed air. In certain examples, the mixer 525 combines and/or adjusts the temperature of the external jet air from the fan or compressor 515 and the temperature of the cooled cooling air from the compressor 520 to form thermally mixed air. In certain examples, the mixer 525 adjusts the temperature of the combined external jet air and cooled cooling air (e.g., cools down the external jet air into cooling air). In some examples, the mixer 525 adjusts the temperature of the combined external jet air and cooled cooling air based on a temperature control signal from the controller 310. In some examples, the combined external jet air and cooled cooling air of the mixer 525 is referred to as mixed air. The combination of different temperatures is referred to as thermally mixed air. In some examples, the mixer 525 is connected to the HPT case cooler/deflector 530 of the ACC system 505 and the rotating parts cooler and clearance control 545 of the CCA system 510 via the valve 550 and the valve 555, respectively.

In some examples, the valve 550 opens and closes for different positions to allow for the cooling air from the mixer 525 to the HPT case cooler/deflector 530 (e.g., the HP turbine 118 case). The valve 550 is controlled by the controller 310, where the controller 310 opens and closes the valve 550 to control the airflow of the cooling air in the ACC system 505. The HPT case cooler/deflector 530 receives the cooling air from the mixer 525 and obtains the cooling air for cooling the case of the turbine (e.g., the HP turbine 118 or the LP turbine 120 of FIG. 1) and/or compressor (e.g., the LP compressor 112 or the high HP compressor 114 of FIG. 1). The HPT case cooler/deflector 530 directs the cooling air to the undercowl 535 and the low pressure turbine (LPT) case cooler/deflector 540. In some examples, the undercowl 535 is a covering on the turbine and/or compressor. The HPT case cooler/deflector 530 directs the cooling air to the undercowl 535 to apply the cooling air to the surfaces of the cases of the turbine and/or compressor to cool the case and decrease the clearance for the turbine engine (e.g., gas turbine engine 100 of FIG. 1). In some examples, the LPT case cooler/deflector 540 directly applies the cooling air to the surface of the LPT case (e.g., the case of the LP turbine 120 of FIG. 1). The HPT case cooler/deflector 530 is connected to the LPT case cooler/deflector 540 through the valve 560. The HPT case cooler/deflector 530 directs the cooling air to the LPT case cooler/deflector 540 through the valve 560. In some examples, the mixer 525 directs the thermally mixed air directly to the LPT case cooler/deflector 540.

In some examples, the valve 560 opens and closes to allow for the cooling air to flow from the HPT case cooler/deflector 530 directly to the LPT case cooler/deflector 540. The valve 560 is controlled by the controller 310, where the controller 310 opens and closes the valve 560 to control the airflow of the cooling air directly to the LPT case cooler/deflector 540. In the illustrated example of FIG. 5, the HPT case cooler/deflector 530 can direct airflow to the HP turbine case (e.g., the HP turbine 118 case) and to both the undercowl 535 and the LPT case cooler/deflector 540 to better control clearance for EGT overshoot or optimization of clearance at other point(s) in the flight mission when needed by the gas turbine engine (e.g., the deteriorated engine condition).

In some examples, the valve 555 opens and closes to allow for the cooling air to flow from the mixer 525 to the rotating parts cooler and clearance control 545 of the CCA system 510. In some examples, the valve 555 is controlled by the controller 310, where the controller 310 opens and closes the valve 555 to control the clearance through changing the flow rate of the cooling air through the valve 555. The rotating parts cooler and clearance control 545 applies the cooling air from the mixer 525 to the rotating parts of the turbine (e.g., the HP turbine 118 or the LP turbine 120 of FIG. 1) and/or compressor (e.g., the LP compressor 112 or the high HP compressor 114 of FIG. 1). The rotating parts cooler and clearance control 545 applies the cooling air to the rotating parts (e.g., blades, disks, etc.) inside the turbine and/or compressor to adjust the deflection of the rotating parts and control the clearance between the rotating parts and the case of the turbine and/or compressor.

In the illustrated example of FIG. 5, the ACC system 505 and CCA system 510 are integrated through the mixer 525. In the illustrated example of FIG. 5, the ACC system 505 and the CCA system 510 obtain air from separate sources (e.g., the fan or compressor 515 and the compressor 520 respectively). The controller 310 of FIG. 5 controls the mixing of the air between the ACC system 505 and the CCA system 510 through the mixer 525. The controller 310 opens and adjusts the flow rate through the valve 550 and the valve 555 using flow rate control signals to allow the mixer 525 to provide the cooling air to the ACC system 505 and the CCA system 510. The valves 550 and 555 allow the clearance control module 320 to achieve tight clearance for the gas turbine engine 100 by integrating the ACC system 505 and the CCA system 510. In the case of EGT overshoot, the controller 310 can increase the flow rate of the valve 550 to control the temperature of the air in the HPT case cooler/deflector 530 to provide the necessary clearance control from the CCA system 510 to the ACC system 505. In some examples, the ACC system 505 and the CCA system 510 are implemented in a turbine (e.g., the HP turbine 118 and/or the LP turbine 120 of FIG. 1). However, in some examples, a compressor (e.g., the LP compressor 112 and/or the HP compressor 114 of FIG. 1) does not include an ACC system (e.g., the ACC system 505). Instead, the compressor includes a PCC system to control clearance instead of the ACC system, where the PCC system is not controlled by the controller 310. In such examples, the CCA system 510 is implemented with a PCC system in the compressor (e.g., the LP compressor 112 and/or the HP compressor 114 of FIG. 1).

Figure 6:
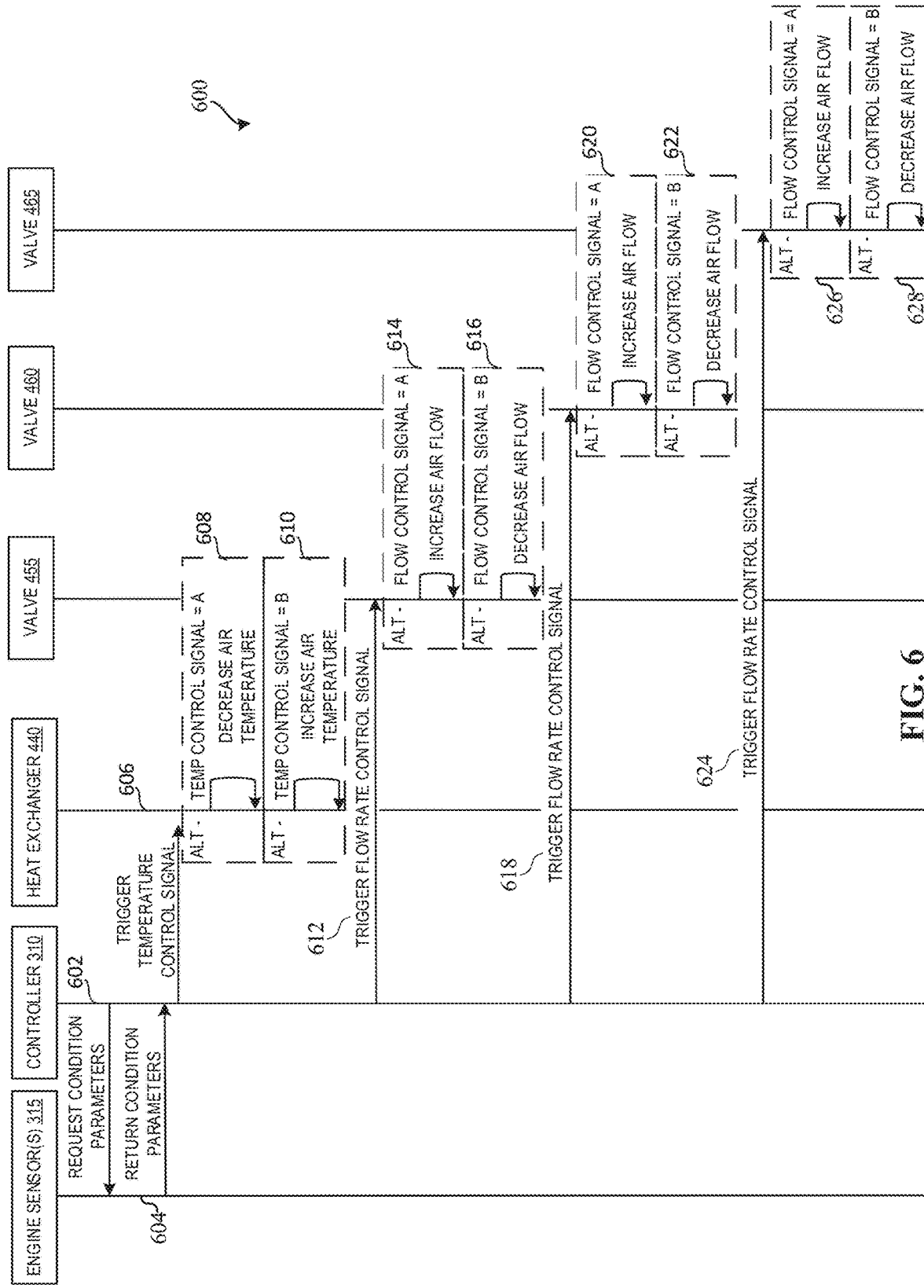
FIG. 6 is a process control diagram of an example interaction between example engine sensor(s), an example controller, an example heat exchanger, and three example valves of the example CCA-ACC system of FIG. 4.

FIG. 6 is a process control diagram 600 of an example interaction between the engine sensor(s) 315, the controller 310, the heat exchanger 440, and the valves 450, 455, and 460 of the CCA-ACC system 400 of FIG. 4.

As shown in the example of FIG. 6, the controller 310 of FIG. 4 requests condition parameters 602 from the engine sensor(s) 315. The engine sensor(s) 315 respond to the controller 310 with a return of condition parameters 604. For example, the controller 310 receives values for a plurality of input variables relating to flight condition parameters (e.g., air density, throttle lever position, engine temperatures, engine pressures, etc.). The engine sensor(s) 315 return the condition parameters to the controller 310. The engine sensor(s) 315 can be mounted on the gas turbine engine 100 and/or positioned elsewhere in the aircraft (e.g., on wing, in cockpit, in main cabin, in engine compartment, in cargo, etc.). The controller 310 computes engine operating parameters such as fuel flow, stator vane position, air bleed valve position, etc., using the flight condition parameters returned by the engine sensor(s) 315.

The controller 310 triggers a temperature control signal 606 to the heat exchanger 440 of FIG. 4 based on the condition parameters returned by the engine sensor(s) 315. In the illustrated example of FIG. 6, the controller 310 determines if the clearance between the rotating parts of the turbine engine and the case is decreasing and/or if there is EGT overshoot in the turbine engine from the condition parameters returned by the engine sensor(s) 315. The controller 310 triggers a temperature control signal 606 to the heat exchanger 440 based on this determination. For example, the value of the temperature control signal is different based on whether the clearance between the rotating parts of the turbine engine and the case is decreasing and/or if there is EGT overshoot in the turbine engine. Based on the value of the temperature control signal, the heat exchanger 440 decreases the air temperature 608 or increases the air temperature 610. For example, when the temperature control signal has a value A, the heat exchanger 440 decreases the air temperature 608, and, when the temperature control signal has a value B, the heat exchanger 440 increases the air temperature 610. In some examples, the value of the temperature control signal is determined based on a temperature measurement in the case of the turbine engine.

The controller 310 triggers a flow rate control signal 612 to the valve 455 of FIG. 4 based on the condition parameters returned by the engine sensor(s) 315. In the illustrated example of FIG. 6, the controller 310 determines if the clearance between the rotating parts of the turbine engine and the case is decreasing or if there is EGT overshoot in the turbine engine from the condition parameters returned by the engine sensor(s) 315. The controller 310 triggers a flow rate control signal 612 to the valve 455 based on this determination. For example, the value of the flow rate control signal is different based on whether the clearance between the rotating parts of the turbine engine and the case is decreasing and/or if there is EGT overshoot in the turbine engine. In some examples, the controller 310 triggers the flow rate control signal 612 to the valve 455 based on the engine condition schedule. For example, if the engine condition is set on the cruise condition, the controller 310 triggers the flow rate control signal 612 to the valve 455 to open the valve 455 to decrease the clearance to improve engine performance. In some examples, if the engine condition is set in the take-off condition, the controller 310 triggers the flow rate control signal 612 to the valve 455 to close the valve 455 to increase the clearance to avoid potential rub events in the maneuver margin during take-off and climb. In some examples, if there is EGT overshoot, the controller 310 triggers the flow rate control signal 612 to the valve 455 to open the valve 455 to compensate for the EGT overshoot. Based on the value of the flow rate control signal, the valve 455 increases air flow 614 or decreases air flow 616 by opening and closing respectively. For example, when the flow rate control signal has a value A, the valve 455 opens and increases the air flow 614, and, when the flow rate control signal has a value B, the valve 455 closes and decreases the air flow 616.

The controller 310 triggers a flow rate control signal 618 to the valve 460 of FIG. 4 based on the condition parameters returned by the engine sensor(s) 315. In the illustrated example of FIG. 6, the controller 310 determines if the clearance between the rotating parts of the turbine engine and the case is decreasing and/or if there is EGT overshoot in the turbine engine from the condition parameters returned by the engine sensor(s) 315. The controller 310 triggers a flow rate control signal 618 to the valve 460 based on this determination. For example, the value of the flow rate control signal is different based on whether the clearance between the rotating parts of the turbine engine and the case is decreasing and/or if there is EGT overshoot in the turbine engine. In some examples, the controller 310 triggers the flow rate control signal 618 to the valve 460 based on the engine condition schedule. For example, if the engine condition is set on the cruise condition, the controller 310 triggers the flow rate control signal 618 to the valve 460 to close the valve 460 to decrease the clearance to improve engine performance. In some examples, the controller 310 triggers the flow rate control signal 618 to the valve 460 based on the condition of the engine. For example, if the engine is in a new engine condition, the controller 310 does not trigger the flow rate control signal 618 because the ACC system 405 covers the clearance range. In some examples, if the engine is in a deteriorated condition, the controller 310 triggers the flow rate control signal 618 to the valve 460 to close the valve 460 to decrease the clearance to compensate for the deteriorated engine condition. In some examples, if there is EGT overshoot, the controller 310 triggers the flow rate control signal 618 to the valve 460 to close the valve 460 to compensate for the EGT overshoot. Based on the value of the flow rate control signal, the valve 460 increases air flow 620 or decreases air flow 622. For example, when the flow rate control signal has a value A, the valve 460 increases the air flow 620, and, when the flow rate control signal has a value B, the valve 460 decreases the air flow 622.

The controller 310 triggers a flow rate control signal 624 to the valve 465 of FIG. 4 based on the condition parameters returned by the engine sensor(s) 315. In the illustrated example of FIG. 6, the controller 310 determines if the clearance between the rotating parts of the turbine engine and the case is decreasing and/or if there is EGT overshoot in the turbine engine from the condition parameters returned by the engine sensor(s) 315. The controller 310 triggers a flow rate control signal 624 to the valve 465 based on this determination. For example, the value of the flow rate control signal is different based on whether the clearance between the rotating parts of the turbine engine and the case is decreasing and/or if there is EGT overshoot in the turbine engine. In some examples, the controller 310 triggers the flow rate control signal 624 to the valve 465 based on the engine condition schedule. For example, if the engine condition is set on the cruise condition, the controller 310 triggers the flow rate control signal 624 to the valve 465 to open the valve 465 to decrease the clearance to improve engine performance. In some examples, if the engine condition is set in the take-off condition, the controller 310 triggers the flow rate control signal 624 to the valve 465 to close the valve 465 to increase the clearance to avoid potential rub events in the maneuver margin during take-off and climb. In some examples, if there is EGT overshoot, the controller 310 triggers the flow rate control signal 624 to the valve 465 to open the valve 465 to compensate for the EGT overshoot. Based on the value of the flow rate control signal, the valve 465 increases air flow 626 or decreases air flow 628. For example, when the flow rate control signal has a value A, the valve 465 increases the air flow 626, and, when the flow rate control signal has a value B, the valve 465 decreases the air flow 628.

Figure 7:
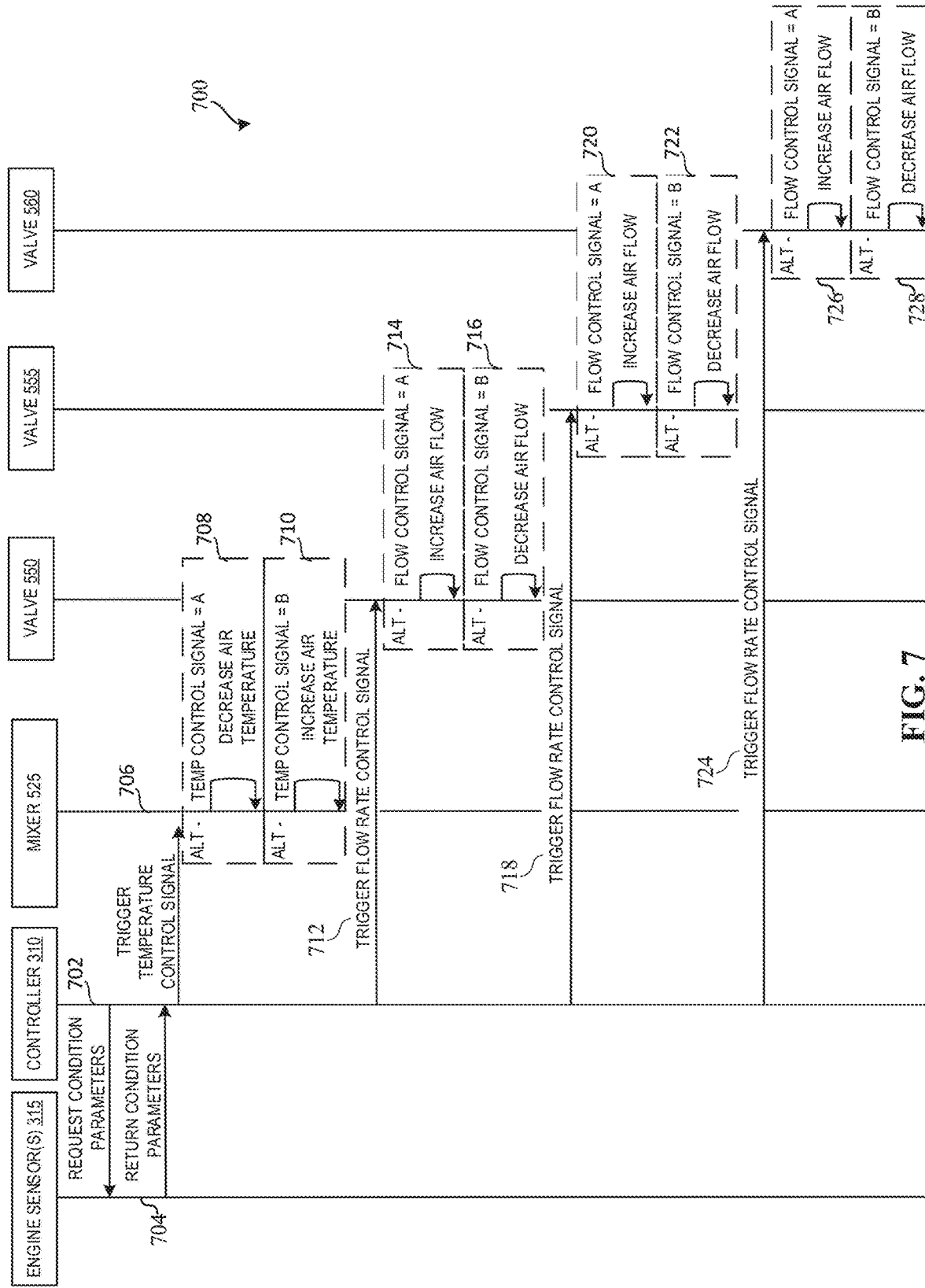
FIG. 7 is a process control diagram of an example interaction between example engine sensor(s), an example controller, an example mixer, and three example valves of the example CCA-ACC system of FIG. 5.

FIG. 7 is a process control diagram 700 of an example interaction between the engine sensor(s) 315, the controller 310, the mixer 525, and the three valves 550, 555, 560 of the example CCA-ACC system 500 of FIG. 5.

As shown in the example of FIG. 7, the controller 310 of FIG. 5 requests condition parameters 702 from the engine sensor(s) 315. The engine sensor(s) 315 respond to the controller 310 with a return of condition parameters 704. For example, the controller 310 receives values for a plurality of input variables relating to flight condition parameters (e.g., air density, throttle lever position, engine temperatures, engine pressures, etc.). The engine sensor(s) 315 return the condition parameters to the controller 310. The engine sensor(s) 315 can be mounted on the gas turbine engine 100 and/or positioned elsewhere in the aircraft (e.g., on wing, in cockpit, in main cabin, in engine compartment, in cargo, etc.). The controller 310 computes engine operating parameters such as fuel flow, stator vane position, air bleed valve position, etc., using the flight condition parameters returned by the engine sensor(s) 315.

The controller 310 triggers a temperature control signal 706 to the mixer 525 of FIG. 5 based on the condition parameters returned by the engine sensor(s) 315. In the illustrated example of FIG. 7, the controller 310 determines if the clearance between the rotating parts of the turbine engine and the case is decreasing or if there is EGT overshoot in the turbine engine from the condition parameters returned by the engine sensor(s) 315. The controller 310 triggers a temperature control signal 706 to the mixer 525 based on this determination. For example, the value of the temperature control signal is different based on whether the clearance between the rotating parts of the turbine engine and the case is decreasing and/or if there is EGT overshoot in the turbine engine. Based on the value of the temperature control signal, the mixer 525 decreases the air temperature 708 or increases the air temperature 710. For example, when the temperature control signal has a value A, the mixer 525 decreases the air temperature 708, and, when the temperature control signal has a value B, the mixer 525 increases the air temperature 710. In some examples, the value of the temperature control signal is determined based on a temperature measurement in the case of the turbine engine. The mixer 525 increases and decreases the air temperature using the thermal mixer included in the mixer 525, which operates similar to the heat exchanger 440 of FIG. 4.

The controller 310 triggers a flow rate control signal 712 to the valve 550 of FIG. 5 based on the condition parameters returned by the engine sensor(s) 315. In the illustrated example of FIG. 7, the controller 310 determines if the clearance between the rotating parts of the turbine engine and the case is decreasing or if there is EGT overshoot in the turbine engine from the condition parameters returned by the engine sensor(s) 315. The controller 310 triggers a flow rate control signal 712 to the valve 550 based on this determination. For example, the value of the flow rate control signal is different based on whether the clearance between the rotating parts of the turbine engine and the case is decreasing and/or if there is EGT overshoot in the turbine engine. In some examples, the controller 310 triggers the flow rate control signal 712 to the valve 550 based on the engine condition schedule. For example, if the engine condition is set on the cruise condition, the controller 310 triggers the flow rate control signal 712 to the valve 550 to open the valve 550 to decrease the clearance to improve engine performance. In some examples, if the engine condition is set in the take-off condition, the controller 310 triggers the flow rate control signal 712 to the valve 550 to close the valve 550 to increase the clearance to avoid potential rub events in the maneuver margin during take-off and climb. In some examples, if there is EGT overshoot, the controller 310 triggers the flow rate control signal 712 to the valve 550 to open the valve 550 to compensate for the EGT overshoot. Based on the value of the flow rate control signal, the valve 550 increases air flow 714 or decreases air flow 716. For example, when the flow rate control signal has a value A, the valve 550 increases the air flow 714, and, when the flow rate control signal has a value B, the valve 550 decreases the air flow 716.

The controller 310 triggers a flow rate control signal 718 to the valve 555 of FIG. 5 based on the condition parameters returned by the engine sensor(s) 315. In the illustrated example of FIG. 7, the controller 310 determines if the clearance between the rotating parts of the turbine engine and the case is decreasing and/or if there is EGT overshoot in the turbine engine from the condition parameters returned by the engine sensor(s) 315. The controller 310 triggers a flow rate control signal 718 to the valve 555 based on this determination. For example, the value of the flow rate control signal is different based on whether the clearance between the rotating parts of the turbine engine and the case is decreasing and/or if there is EGT overshoot in the turbine engine. In some examples, the controller 310 triggers the flow rate control signal 718 to the valve 555 based on the engine condition schedule. For example, if the engine condition is set on the cruise condition, the controller 310 triggers the flow rate control signal 718 to the valve 555 to close the valve 555 to decrease the clearance to improve engine performance. In some examples, the controller 310 triggers the flow rate control signal 718 to the valve 555 based on the condition of the engine. For example, if the engine is in a new engine condition, the controller 310 does not trigger the flow rate control signal 718 because the ACC system 505 covers the clearance range. In some examples, if the engine is in a deteriorated condition, the controller 310 triggers the flow rate control signal 718 to the valve 555 to close the valve 555 to decrease the clearance to compensate for the deteriorated engine condition. In some examples, if there is EGT overshoot, the controller 310 triggers the flow rate control signal 718 to the valve 555 to close the valve 555 to compensate for the EGT overshoot. Based on the value of the flow rate control signal, the valve 555 increases air flow 720 or decreases air flow 722. For example, when the flow rate control signal has a value A, the valve 555 increases the air flow 720, and, when the flow rate control signal has a value B, the valve 555 decreases the air flow 722.

The controller 310 triggers a flow rate control signal 724 to the valve 560 of FIG. 5 based on the condition parameters returned by the engine sensor(s) 315. In the illustrated example of FIG. 7, the controller 310 determines if the clearance between the rotating parts of the turbine engine and the case is decreasing and/or if there is EGT overshoot in the turbine engine from the condition parameters returned by the engine sensor(s) 315. The controller 310 triggers a flow rate control signal 724 to the valve 560 based on this determination. For example, the value of the flow rate control signal is different based on whether the clearance between the rotating parts of the turbine engine and the case is decreasing and/or if there is EGT overshoot in the turbine engine. In some examples, the controller 310 triggers the flow rate control signal 724 to the valve 560 based on the engine condition schedule. For example, if the engine condition is set on the cruise condition, the controller 310 triggers the flow rate control signal 724 to the valve 560 to open the valve 560 to decrease the clearance to improve engine performance. In some examples, if the engine condition is set in the take-off condition, the controller 310 triggers the flow rate control signal 724 to the valve 560 to close the valve 560 to increase the clearance to avoid potential rub events in the maneuver margin during take-off and climb. In some examples, if there is EGT overshoot, the controller 310 triggers the flow rate control signal 724 to the valve 560 to open the valve 560 to compensate for the EGT overshoot. Based on the value of the flow rate control signal, the valve 560 increases air flow 726 or decreases air flow 728. For example, when the flow rate control signal has a value A, the valve 560 increases the air flow 726, and, when the flow rate control signal has a value B, the valve 560 decreases the air flow 728.

Figures 8A, 8B:
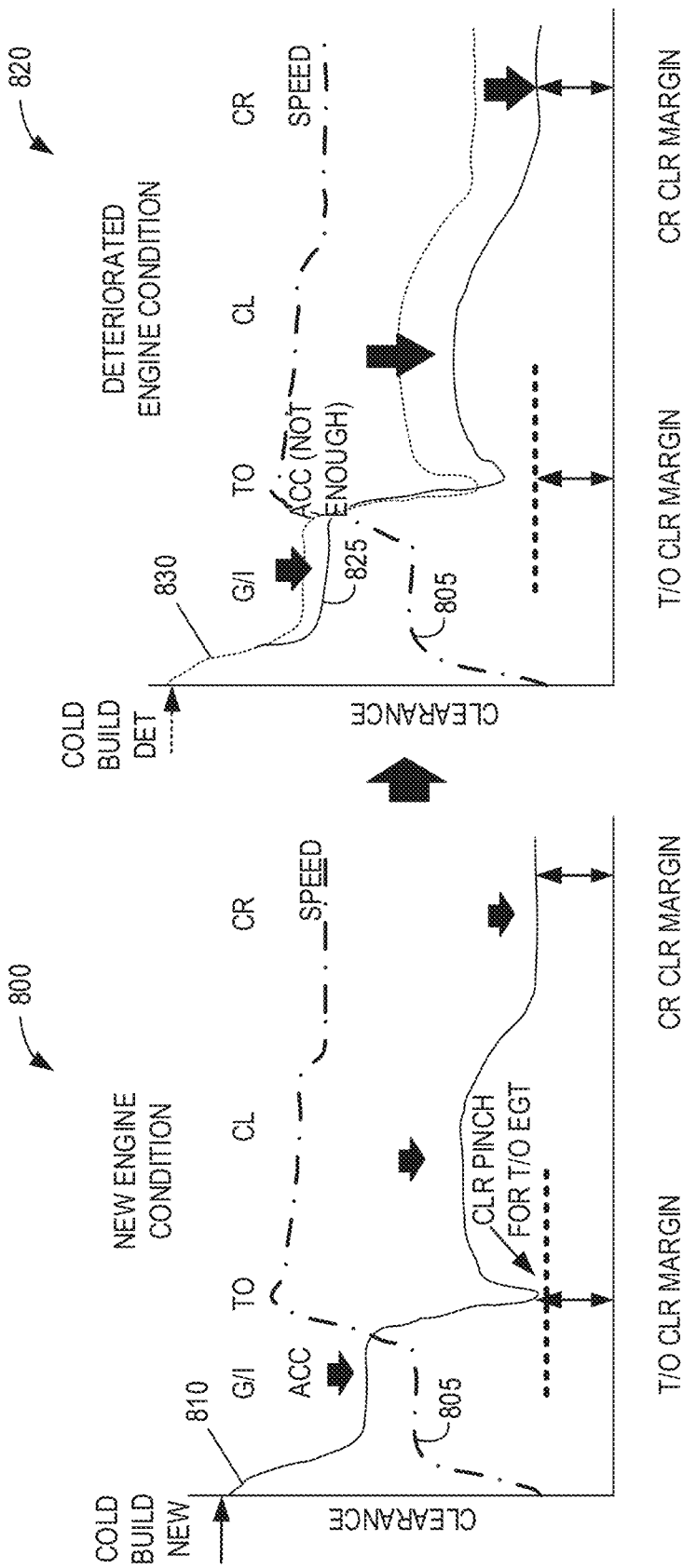
FIGS. 8A, 8B are example graph representations of clearances for an example prior ACC system.

FIGS. 8A, 8B are example graph representations of typical turbine clearances for example prior ACC systems 200 and 250 of FIGS. 2A and 2B. The example graph 800 of FIG. 8A illustrates clearance measurement for a gas turbine engine (e.g., the gas turbine engine 100 of FIG. 1) in a new engine condition (e.g., an engine that has not been used before or an engine that has been used a small amount of times) with the prior ACC systems 200 and 250 of FIGS. 2A and 2B. The graph 800 includes the speed measurement 805 for the gas turbine engine and the clearance measurement 810 for the gas turbine engine with the prior ACC systems 200 and 250 of FIGS. 2A and 2B. In the graph 800, the x-axis is representative of time and the y-axis is representative of clearance measurement between the stator and rotor of the gas turbine engine. In the prior systems 200 and 250 of FIGS. 2A and 2B, the ACC systems use only fan/compressor air (e.g., the fan or compressor 205) that does not have sufficient clearance control capability (e.g., the ACC systems do not provide sufficient power, airflow, cooling temperature adjustment, clearance precision, etc.) at low power (e.g., ground idle (G/I)) to control the clearance in the gas turbine engine as the engine is deteriorated. In the new engine condition of graph 800, the prior systems 200 and 250 use the full clearance control power of the ACC system to control clearance and the EGT overshoot at take-off (T/O).

The example graph 820 of FIG. 8B illustrates clearance measurement for the gas turbine engine in a deteriorated condition. The graph 820 includes the speed measurement 805 for the gas turbine engine, the clearance measurement 825 for the gas turbine engine with the prior ACC systems 200 and 250 of FIGS. 2A and 2B, and the clearance measurement 830 for the deteriorated engine condition. In the graph 820, the x-axis is representative of time and the y-axis is representative of clearance measurement between the stator and rotor of the gas turbine engine In the prior systems 200 and 250 of FIGS. 2A and 2B, the ACC systems use only fan/compressor air (e.g., the fan or compressor 205) that does not have sufficient clearance control capability at low power (e.g., G/I) to control the clearance in the gas turbine engine. In the deteriorated engine condition of graph 820, the prior systems 200 and 250 do not have the capability to control the case to control clearance and the EGT overshoot at take-off (T/O), which is shown in the gap between the clearance measurement 825 and the new engine condition clearance measurement 810 of FIG. 8A.

FIGS. 9A, 9B are example graph representations of typical turbine clearances for the example CCA-ACC system 400 and 500 of FIGS. 4, 5. The example graph 900 of FIG. 9A illustrates clearance measurement for a gas turbine engine (e.g., the gas turbine engine 100 of FIG. 1) in new engine condition with the CCA-ACC systems 400 and 500 of FIGS. 4 and 5. The graph 900 includes the speed measurement 905 for the gas turbine engine, the clearance measurement 910 for the gas turbine engine with the ACC systems of the clearance control module 320 FIGS. 4 and 5, and the clearance measurement 910 for the gas turbine engine with the ACC and CCA systems 400, 500 of the clearance control module 320 of FIGS. 4 and 5. In the graph 900, the x-axis is representative of time and the y-axis is representative of clearance measurement between the stator and rotor of the gas turbine engine. In the CCA-ACC systems of FIGS. 4 and 5, the ACC systems are integrated with the CCA systems to provide sufficient clearance control capability (e.g., the CCA systems provide additional power, airflow, cooling temperature adjustment, clearance precision, etc.) at low power (e.g., G/I) to control the clearance in the gas turbine engine. The integrated CCA system optimizes clearance control from the ACC system as seen in the clearance measurement 910 for the gas turbine engine with the ACC and CCA systems 400, 500.

The example graph 920 of FIG. 9B illustrates clearance measurement for a gas turbine engine (e.g., the gas turbine engine 100 of FIG. 1) in deteriorated engine condition with the CCA-ACC systems 400 and 500 of FIGS. 4 and 5. The graph 920 includes the speed measurement 905 for the gas turbine engine, the clearance measurement 925 for the gas turbine engine with the ACC systems of the clearance control module 320 FIGS. 4 and 5, and the clearance measurement 930 for the gas turbine engine with the ACC and CCA systems of the clearance control module 320 of FIGS. 4 and 5. In the graph 900, the x-axis is representative of time and the y-axis is representative of clearance measurement between the stator and rotor of the gas turbine engine. In the CCA-ACC systems of FIGS. 4 and 5, the ACC systems are integrated with the CCA systems to provide sufficient clearance control capability at low power (e.g., G/I) to control the clearance and EGT in the gas turbine engine. In the deteriorated engine condition of graph 920, the clearance measurement 925 for the gas turbine engine with the ACC system does not reach the target clearance because the ACC system does not have the capability to cool the case to control clearance as the new engine condition of FIG. 9A. However, the integrated CCA system provides increased clearance power (e.g., provides additional power, airflow, cooling temperature adjustment, clearance precision, etc.) to the ACC system to reach the target clearance as seen in the clearance measurement 930 for the gas turbine engine with the ACC and CCA systems.

In the illustrated examples, the CCA-ACC systems 400 and 500 of FIGS. 4 and 5 are able to achieve the same clearance margin in both the new engine condition (FIG. 9A) and the deteriorated engine condition (9B). The CCA-ACC systems 400 and 500 of FIGS. 4 and 5 are able to control the transient take-off (T/O) clearance pinch and maintain the EGT margin effectively compared to prior ACC systems 200 and 250 of FIGS. 2A and 2B as seen in FIGS. 8A and 8B.

Figure 10:
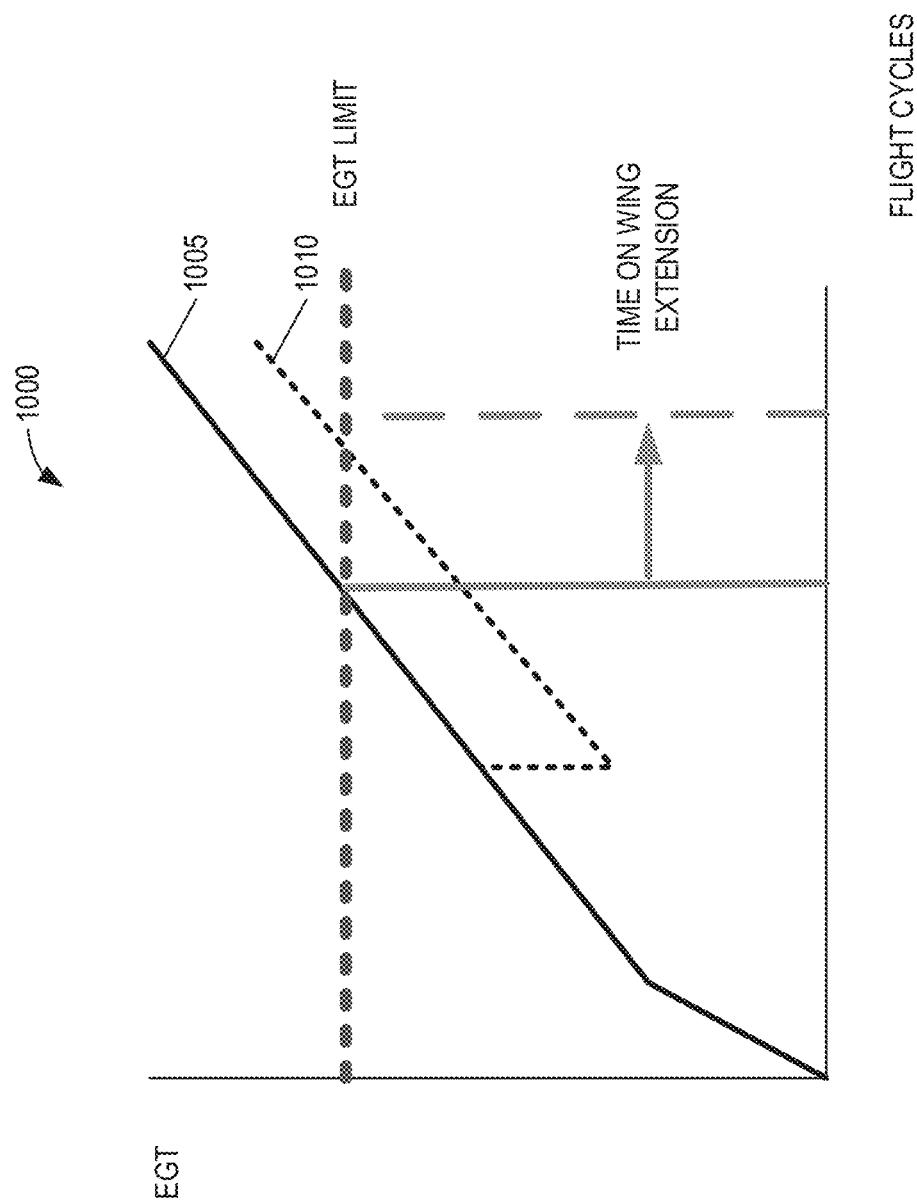
FIG. 10 is an example graph representation of exhaust gas temperature (EGT) and Time-on-Wing (TOW) improvements for the example CCA-ACC system of FIGS. 4, 5.

FIG. 10 is an example graph representation of EGT and Time-on-Wing (TOW) improvements for the example CCA-ACC systems 400 and 500 of FIGS. 4 and 5. The example graph 1000 of FIG. 10 illustrates the EGT measurement 1005 for the prior ACC systems 200 and 250 of FIGS. 2A and 2B and the EGT measurement 1010 for the CCA-ACC systems 400 and 500 of FIGS. 4 and 5. In the graph 1000, the x-axis is representative of flight cycles for the gas turbine engine (e.g., how many flights the engine operates during), and the y-axis is representative of the EGT measurement for those flight cycles. The graph 1000 includes an EGT limit, where the gas turbine engine TOW is met and the gas turbine engine is refurbished or retired (e.g., no longer able to be used). The EGT limit of graph 1000 illustrates the maximum EGT a gas turbine can reach before it is too deteriorated for continued operation. The graph 1000 illustrates that the EGT measurement 1010 for the CCA-ACC systems 400 and 500 of FIGS. 4 and 5 does not reach the EGT limit until much later in flight cycles compared to the EGT measurement 1005 for the prior ACC systems 200 and 250 of FIGS. 2A and 2B. The delay in reaching the EGT limit for the CCA-ACC systems 400 and 500 of FIGS. 4 and 5 also extends the TOW for the gas turbine engine with the CCA-ACC systems 400 and 500 of FIGS. 4 and 5 since the EGT limit is reached much later in flight cycles as seen in the EGT measurement 1010. The graph 1000 illustrates how the heat exchanger 440 and mixer 525 of the CCA-ACC systems 400 and 500 of FIGS. 4 and 5 respectively provide enough clearance control capability (e.g., power, airflow, cooling temperature adjustment, clearance precision, etc.) for the necessary EGT recovery of a gas turbine engine by providing additional changes in airflow and temperature to the components of the gas turbine engine (e.g., the case and rotating parts), which improves the TOW for deteriorated engines.

Figure 11:
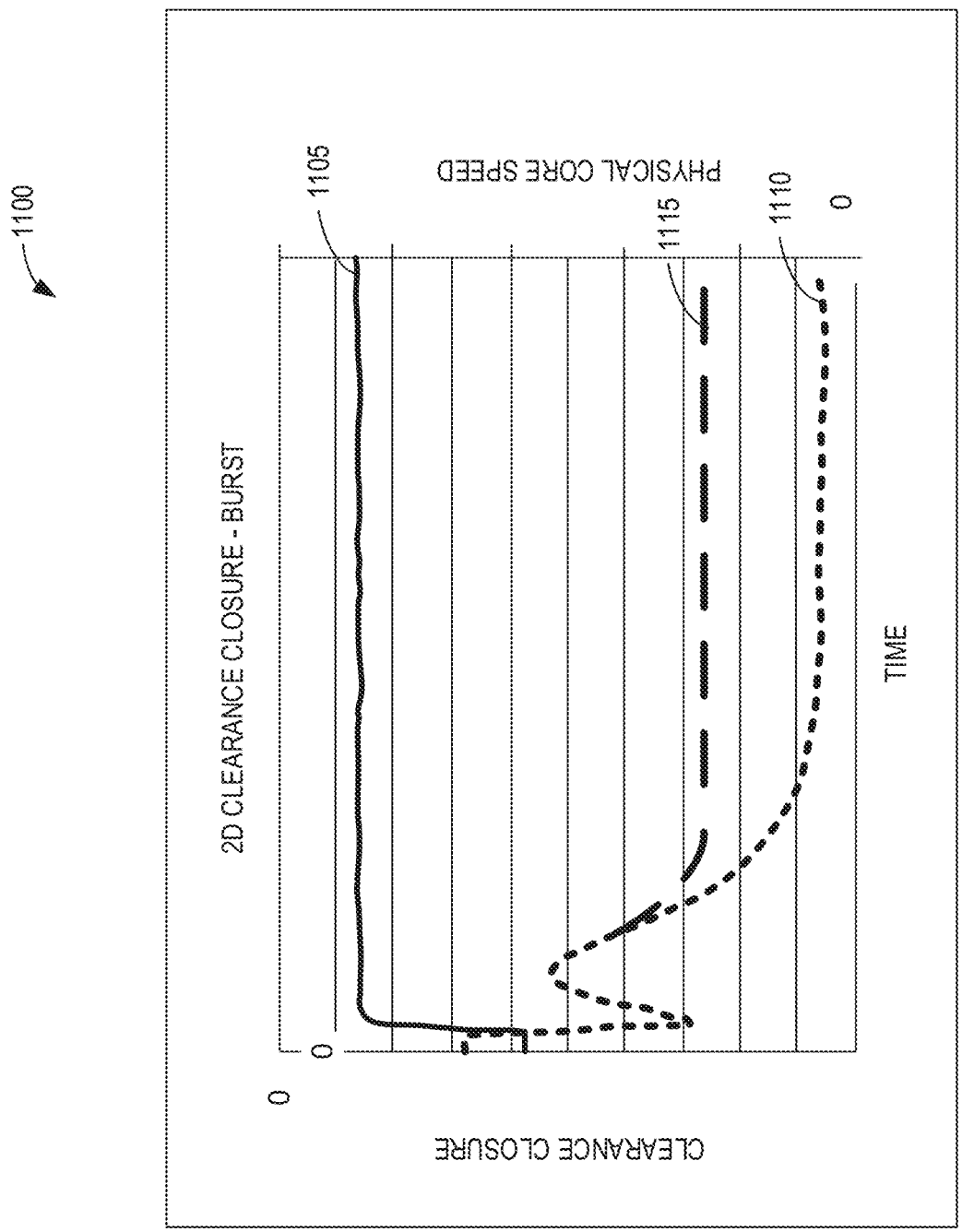
FIG. 11 is an example graph of typical two-dimensional clearance closure of a conventional compressor for an example prior ACC system and the example CCA-ACC systems of FIGS. 4, 5.

FIG. 11 is an example graph of typical, two-dimensional compressor clearance closure for the prior ACC systems 200 and 250 of FIGS. 2A and 2B and the example CCA-ACC systems 400 and 500 of FIGS. 4, 5. The example graph 1100 of FIG. 11 illustrates the clearance closure for the prior ACC systems 200 and 250 of FIGS. 2A and 2B and the CCA-ACC systems 400 and 500 of FIGS. 4, 5 during a burst mission cycle simulated by high performance computing (HPC). The graph 1100 includes an example speed measurement 1105, an example clearance closure measurement 1110 for the prior ACC systems 200 and 250 of FIGS. 2A and 2B, and an example clearance closure measurement 1115 for the CCA-ACC systems 400 and 500 of FIGS. 4 and 5. The graph 1100 illustrates the increase in clearance closure for the CCA-ACC systems 400 and 500 of FIGS. 4 and 5 (clearance closure measurement 1115) compared to the clearance closure for the prior ACC systems 200 and 250 of FIGS. 2A and 2B (clearance closure measurement 1110).

Figure 12:
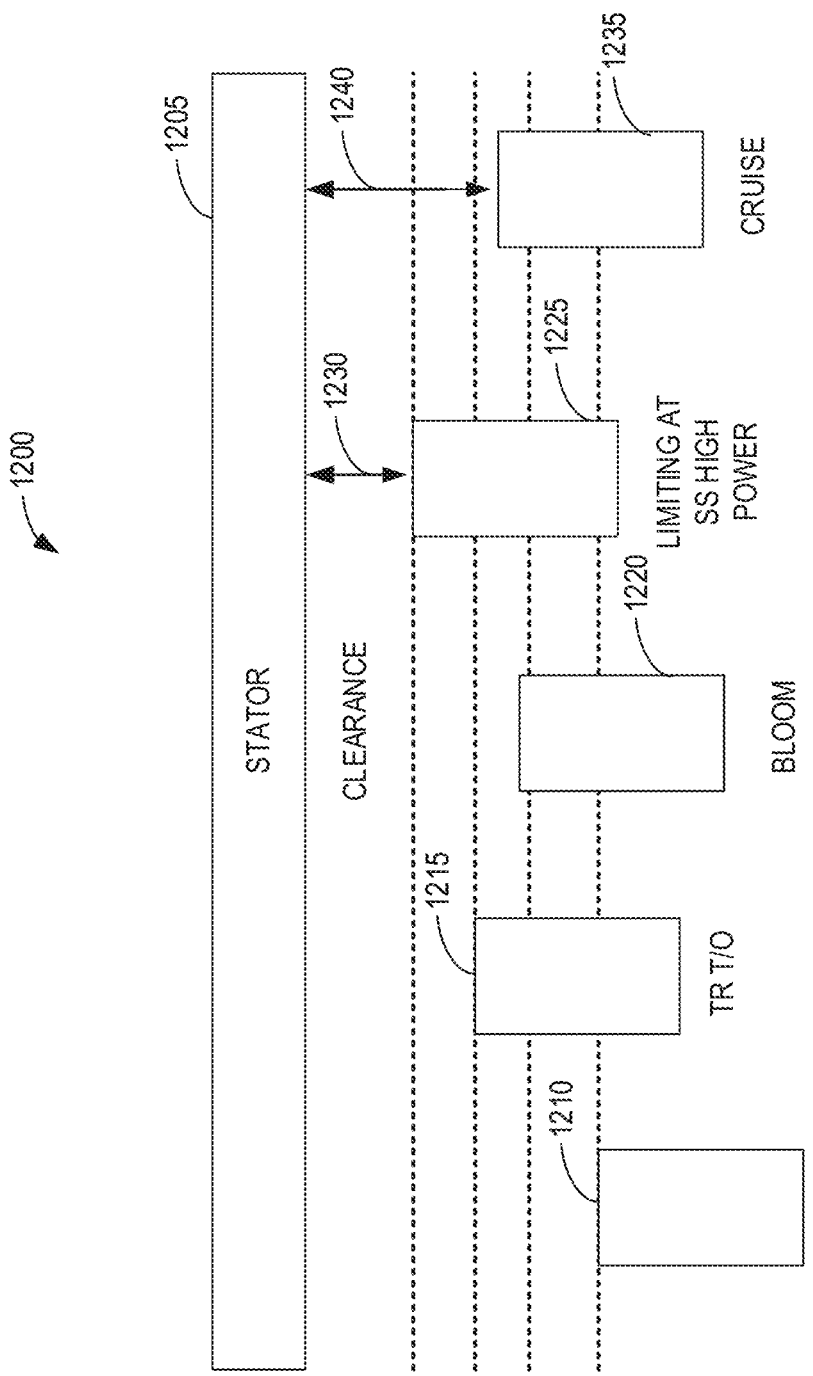
FIG. 12 is an example schematic of compressor rotor relative radial movement for an example without an ACC system.

FIG. 12 is an example schematic 1200 of rotor relative radial movement in a typical compressor for an example PCC system (e.g., a compressor without an ACC system). In some examples, the schematic 1200 illustrates rotor relative radial movement based on a PCC system that is controlled by material selection and mechanical design (e.g., not controller by a controller). In the schematic 1200, the boxes are representative of the rotor placement in relation to the stator 1205 (clearance) of the gas turbine engine for the PCC system. The schematic 1200 includes an example rotor placement for a cold engine 1210, an example rotor placement for an engine during transient take-off (T/O) 1215, an example rotor placement for an engine during bloom 1220, an example rotor placement for an engine at high power 1225, and an example rotor placement for an engine at cruise 1235. In some examples, the rotor placement for the cold engine 1210, the transient T/O 1215, the bloom 1220, and the high power 1225 are associated with the clearance closure measurement 1110 of FIG. 11. The rotor placement for an engine at high power 1225 includes an example limiting clearance 1230. The rotor placement for an engine at cruise 1235 also includes the clearance measurement 1240.

In the illustrated example of FIG. 12, the clearance between the rotor and the stator 1205 are limited by the prior systems of a typical compressor, PCC, for the high power 1225 and cruise 1235 conditions. The schematic 1200 includes a limiting clearance 1230 for the rotor placement for an engine at high power 1225 represents that the prior system of typical compressor design, PCC system, does not have enough clearance control capability to control the limiting clearance 1230 at high power.

Figure 13:
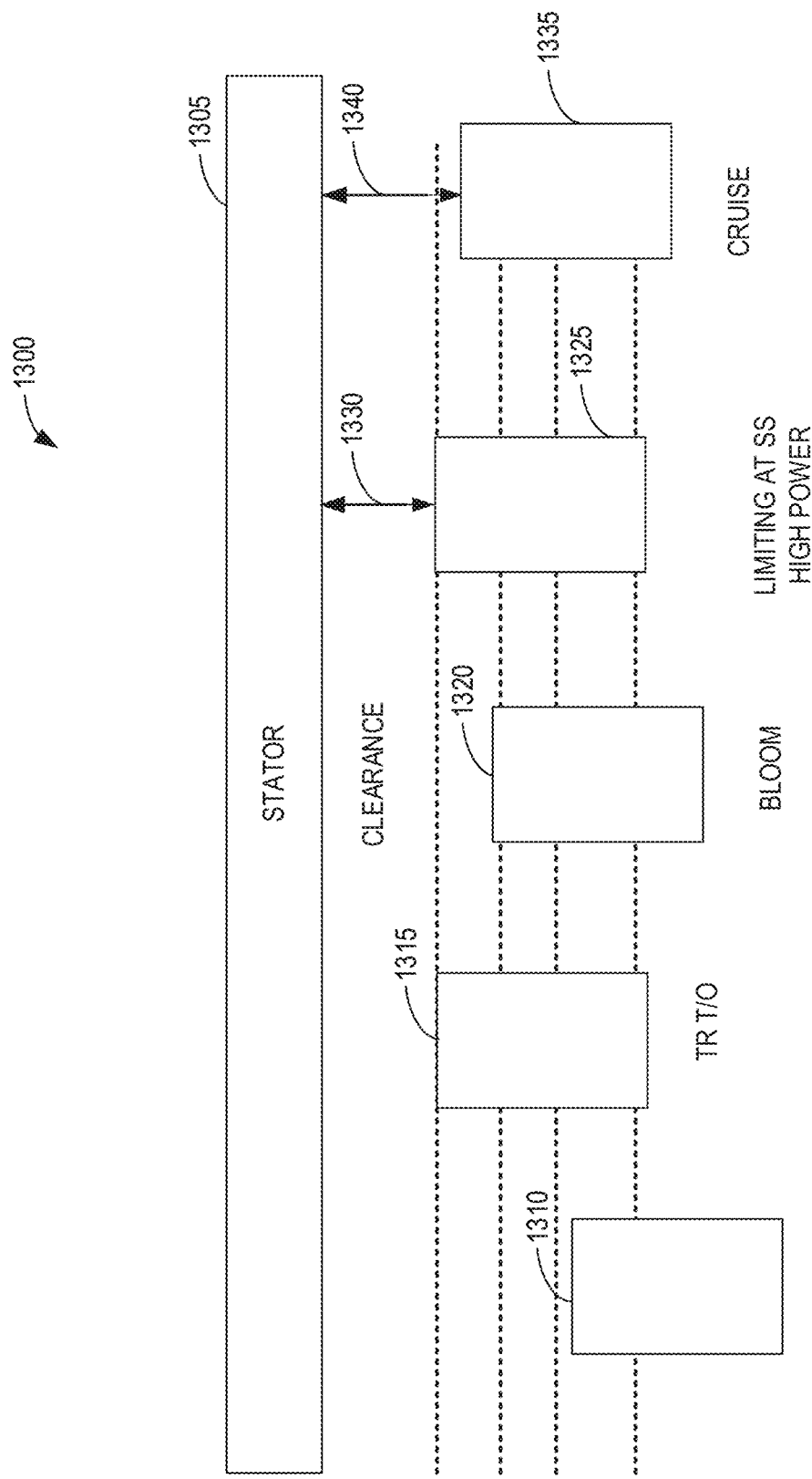
FIG. 13 is an example schematic of compressor rotor relative radial movement for the example CCA-ACC systems of FIGS. 4, 5.

FIG. 13 is an example schematic 1300 of rotor relative radial movement in a typical compressor for the example CCA-ACC systems 400 and 500 of FIGS. 4 and 5. In some examples, the schematic 1300 of rotor relative radial movement changed by the CCA systems of the CCA-ACC systems 400 and 500 of FIGS. 4 and 5. In the schematic 1300, the boxes are representative of the rotor placement in relation to the stator 1305 (clearance) of the gas turbine engine for the CCA-ACC systems 400 and 500 of FIGS. 4 and 5. In some examples, the boxes are associated with the clearance closure measurement 1115 of FIG. 11 for each of the engine conditions. The schematic 1300 includes an example rotor placement for a cold engine 1310, an example rotor placement for an engine during transient take-off (T/O) 1315, an example rotor placement for an engine during bloom 1320, an example rotor placement for an engine at high power 1325, and an example rotor placement for an engine at cruise 1335. The rotor placement for an engine at high power 1325 includes an example clearance measurement 1330 from the stator 1305. The rotor placement for an engine at cruise 1335 also includes the clearance measurement 1340.

In the illustrated example of FIG. 13, the clearance between the rotor and the stator 1305 for the high power 1325 and cruise 1335 conditions are improved by the CCA-ACC systems 400 and 500 of FIGS. 4 and 5 compared to the PCC system of the compressor of FIG. 12. The schematic 1300 illustrates a tighter clearance for the clearance measurement 1330 for the rotor placement for an engine at high power 1325 and for the clearance measurement 1340 for the rotor placement for an engine at cruise 1335 compared to the cruise clearance 1240 of FIG. 12 described above. The illustrated example of FIG. 13 illustrates the improved clearance (e.g., tighter clearance at cruise to improve performance point) between the rotor and stator 1305 with the CCA-ACC systems 400 and 500 of FIGS. 4 and 5.

While an example manner of implementing the controller 310 of FIG. 3 is illustrated in FIGS. 4, 5, 6, and 7, one or more of the elements, processes and/or devices illustrated in FIGS. 4, 5, 6, and 7 may be combined, divided, re-arranged, omitted, eliminated and/or implemented in any other way. Further, sensor(s) processor 325, the example flow rate controller 330, the example temperature controller 335 and/or, more generally, the example controller 310 of FIG. 3 may be implemented by hardware, software, firmware and/or any combination of hardware, software and/or firmware. Thus, for example, any of the example sensor(s) processor 325, the example flow rate controller 330, the example temperature controller 335 and/or, more generally, the example controller 310 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor(s) processor 325, the example flow rate controller 330, and/or the example temperature controller 335 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 310 of FIG. 3 may include one or more elements, processes and/or devices in addition to, or instead of, those illustrated in FIGS. 4, 5, 6, and 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 14:
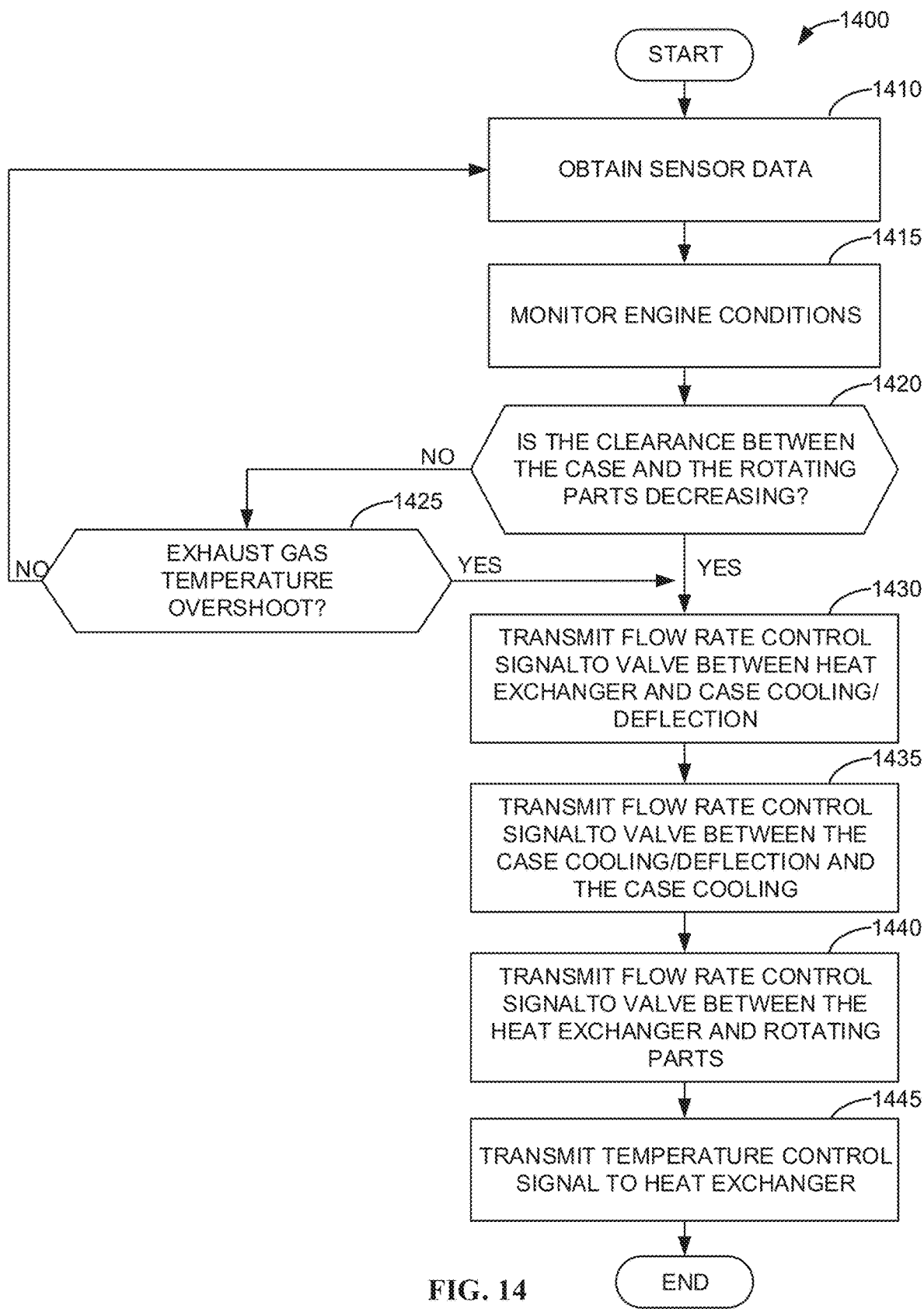
FIG. 14 is a flowchart representative of machine readable instructions which may be executed to implement the example controller of FIG. 3 in conjunction with the example CCA-ACC system of FIG. 4.
Figure 15:
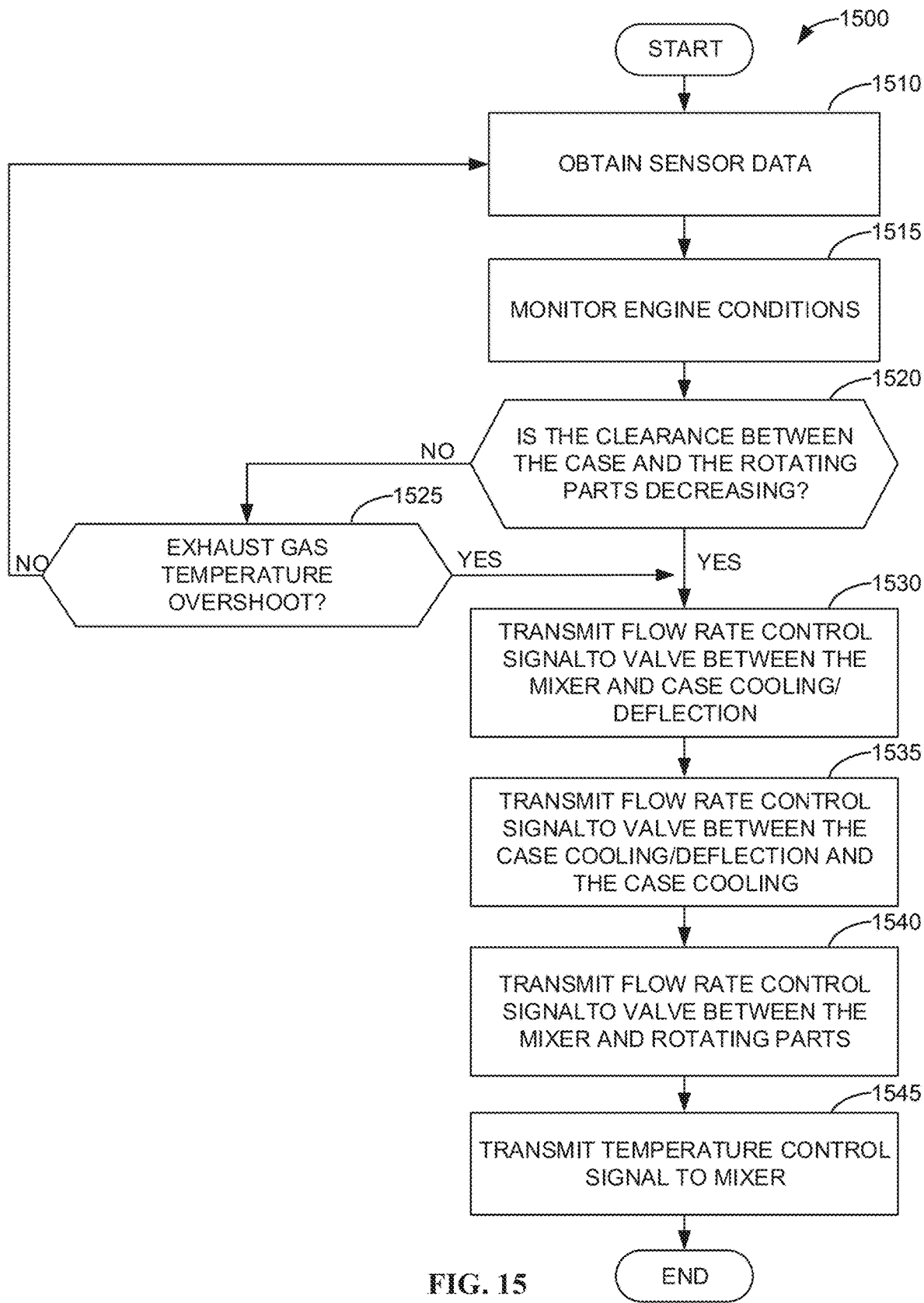
FIG. 15 is a flowchart representative of machine readable instructions which may be executed to implement the example controller of FIG. 3 in conjunction with the example CCA-ACC system of FIG. 5.

Flowcharts representative of example hardware logic, machine readable instructions, hardware implemented state machines, and/or any combination thereof for implementing the controller 310 of FIG. 3 is shown in FIGS. 14 and 15. The machine readable instructions may be one or more executable programs or portion(s) of an executable program for execution by a computer processor and/or processor circuitry, such as the processor 1612 shown in the example processor platform 1600 discussed below in connection with FIG. 16. The program may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowchart illustrated in FIGS. 14 and 15, many other methods of implementing the example controller 310 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 14 and 15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 14 is a flowchart representative of machine readable instructions which may be executed to implement the example controller of FIG. 3 in conjunction with the example CCA-ACC system 400 of FIG. 4. The program 1400 of FIG. 14 begins execution at block 1410 at which the example sensor(s) processor 325 obtains the sensor data from the example engine sensor(s) 315. In some examples, the sensor data includes the flight condition data obtained by the engine sensor(s) 315 from an engine (e.g., the gas turbine engine 100 of FIG. 1). In some examples, flight condition data of the sensor data includes values for a plurality of input variables relating to flight conditions (e.g., air density, throttle lever position, engine temperatures, engine pressures, etc.).

At block 1415, the sensor(s) processor 325 monitors the engine conditions based on the sensor data from the engine sensor(s) 315. For example, the sensor(s) processor 325 can calculate and monitor the fuel flow, stator vane position, air bleed valve position, direct clearance measurements, indirect clearance measurements, etc., using the flight condition data included in the sensor data. For example, the sensors data from the engine sensor(s) 315 can include air temperature measurements, engine pressure measurements, airflow measurements from valves in the engine, distance between components (e.g., stator, rotor, etc.), etc. The sensor(s) processor 325 can use these measurements to calculate and monitor engine conditions (e.g., the distance between the stator and rotor from the sensor data can be used to determine a direct clearance measurement). In some examples, the sensor(s) processor 325 compares the engine conditions to known model estimates for those conditions to monitor the engine conditions for any changes. At block 1420, the sensor(s) processor 325 determines if the clearance between the case and the rotating parts is decreasing based on the engine conditions determined from the obtained flight condition data. For example, the sensor(s) processor 325 can determine/calculate the clearance between the stator and rotor of the engine based on the sensor data from the engine sensor(s) 315. In this example, the sensor(s) processor 325 compares the clearance calculation from the sensor data to the target clearance scheduled for the operating conditions by the controller 310 for the clearance measurement to determine whether a change in clearance is warranted for the gas turbine engine 100. In some examples, the sensor(s) processor 325 determines if the clearance between the case and the rotating parts is decreasing based on the comparison between the clearance calculation and the target clearance. If the sensor(s) processor 325 determines that the clearance between the case the rotating parts is not decreasing, then the program 1400 continues to block 1425 at which the sensor(s) processor 325 determines if there is exhaust gas temperature overshoot. If the sensor(s) processor 325 determines that the clearance between the case and the rotating parts is decreasing, then the program 1400 continues to block 1430 at which the example flow rate controller 330 transmits a flow rate control signal to the valve between the heat exchanger and case cooler.

At block 1425, the sensor(s) processor 325 determines if there is exhaust gas temperature overshoot. In some examples, the sensor(s) processor 325 determines if there is exhaust gas temperature overshoot based on the engine conditions determined from the obtained flight condition data. For example, the sensor(s) processor 325 directly measures exhaust gas temperature from EGT sensors. If the sensor(s) processor 325 determines there is exhaust gas temperature overshoot, then program 1400 continues to block 1430 at which the flow rate controller 330 transmits a flow rate control signal to the valve between the heat exchanger and case cooler. If the sensor(s) processor 325 determines that there is no exhaust gas temperature overshoot, then program 1400 returns to block 1410 at which the sensor(s) processor 325 obtains the sensor data.

At block 1430, the flow rate controller 330 transmits a flow rate control signal to the valve 455 between the heat exchanger 440 and the HPT case cooler/deflector 420 of FIG. 4. In some examples, the flow rate control signal causes the valve 455 to open and close to modulate/regulate the airflow rate between the heat exchanger 440 and the HPT case cooler/deflector 420 (e.g., the HP turbine 118 case). In some examples, the valve 455 is opened and closed in variable positions. For example, the valve 455 can be opened and closed into positions ranging from 0% open to 100% open to meet the target clearance. In some examples, if the difference between the calculated clearance and the target clearance is large, the flow rate control signal causes the valve 455 to open and close quickly to decrease the difference to zero (e.g., no difference between the calculate clearance and target clearance). In some examples, if the difference between the calculated clearance and the target clearance is small, the flow rate control signal causes the valve 455 to open and close slowly to decrease the difference to zero. In some examples, the controller 310 causes a lag time (e.g., the time for the controller 310 to transmit the flow rate control signal to the valve 455). In the illustrated example, the flow rate controller 330 transmits a flow rate control signal to the valve 455 that increases the airflow rate between the heat exchanger 440 and the HPT case cooler/deflector 420. The increase in airflow rate increases the amount of cooling air to the HPT case cooler/deflector 420, which provides more cooling air to the ACC system to decrease the clearance in response to an increase in clearance between the case and the rotating parts or an EGT overshoot.

At block 1435, the flow rate controller 330 transmits a flow rate control signal to the valve 455 between the HPT case cooler/deflector 420 and the case cooling (e.g., the LPT case cooler/deflector 430) of FIG. 4. In some examples, the flow rate control signal causes the valve 455 to open and close to modulate/regulate the airflow rate between the HPT case cooler/deflector 420 and the LPT case cooler/deflector 430. In the illustrated example, the flow rate controller 330 transmits a flow rate control signal to the valve 465 that increases the airflow rate between the HPT case cooler/deflector 420 and the LPT case cooler/deflector 430. In the example for cooling and decreasing clearances, the increase in airflow rate increases the amount of cooling air to the LPT case cooler/deflector 430, which decreases the clearance in response to an increase in clearance between the case and the rotating parts or an EGT overshoot.

At block 1440, the flow rate controller 330 transmits a flow rate control signal to the valve 460 between the heat exchanger 440 and the rotating parts (e.g., the rotating parts cooler and clearance control 445) of FIG. 4. In some examples, the flow rate control signal causes the valve 460 to open and close to modulate/regulate the airflow rate between the heat exchanger 440 and the rotating parts cooler and clearance control 445. In the illustrated example, the flow rate controller 330 transmits a flow rate control signal to the valve 460 that decreases the airflow rate between the heat exchanger 440 and the rotating parts cooler and clearance control 445. The decrease in airflow rate decreases the amount of cooling air to the rotating parts cooler and clearance control 445, which provides less cooling air (than the baseline) to the CCA system to decrease the clearance in response to an increase in clearance between the case and the rotating parts or an EGT overshoot. In some examples, the cooling air is provided to the CCA system when the EGT measured from the EGT sensors is over or near an EGT limit (e.g., an EGT overshoot).

At block 1445, the example temperature controller 335 transmits a temperature control signal to the heat exchanger 440 of FIG. 4. In some examples, the temperature control signal causes the heat exchanger 440 to adjust/modulate the temperature of the cooling air in the heat exchanger 440. In the illustrated example, the temperature controller 335 transmits a temperature control signal to the heat exchanger 440 that decreases the temperature of the cooling air. The decrease in air temperature allows the cooling air to cool the components of the turbine engine faster, which can control clearance more effectively by cooling the case and the rotating parts or an EGT overshoot in response to a change in clearance between the case and the rotating parts or an EGT overshoot. For example, applying cooling air to the case helps to decrease the clearance between the case and the rotating parts. In some examples, applying cooling air to the rotating parts (e.g., rotor) increases the clearance between the case and the rotating parts. Once the temperature controller 335 transmits the temperature control signal to the heat exchanger 440, program 1400 ends. In some examples, program 1400 is a continuous loop where once the temperature controller 335 transmits the temperature control signal to the heat exchanger 440, program 1400 returns to block 1410 at which the example sensor(s) processor 325 obtains the sensor data from the example engine sensor(s) 315.

FIG. 15 is a flowchart representative of machine readable instructions which may be executed to implement the example controller of FIG. 3 in conjunction with the example CCA-ACC system 500 of FIG. 5. The program 1500 of FIG. 15 begins execution at block 1510 at which the example sensor(s) processor 325 obtains the sensor data from the example engine sensor(s) 315. In some examples, the sensor data includes the flight condition data obtained by the engine sensor(s) 315 from an engine (e.g., the gas turbine engine 100 of FIG. 1). In some examples, flight condition data of the sensor data includes values for a plurality of input variables relating to flight conditions (e.g., air density, throttle lever position, engine temperatures, engine pressures, etc.).

At block 1515, the sensor(s) processor 325 monitors the engine conditions based on the sensor data from the engine sensor(s) 315. For example, the sensor(s) processor 325 can calculate and monitor the fuel flow, stator vane position, air bleed valve position, direct clearance measurements, indirect clearance measurements, etc., using the flight condition data included in the sensor data. For example, the sensors data from the engine sensor(s) 315 can include air temperature measurements, engine pressure measurements, airflow measurements from valves in the engine, distance between components (e.g., stator, rotor, etc.), etc. The sensor(s) processor 325 can use these measurements to calculate and monitor engine conditions (e.g., the distance between the stator and rotor from the sensor data can be used to determine a direct clearance measurement). In some examples, the sensor(s) processor 325 compares the engine conditions to known model estimates for those conditions to monitor the engine conditions for any changes. At block 1520, the sensor(s) processor 325 determines if the clearance between the case and the rotating parts is decreasing based on the engine conditions determined from the obtained flight condition data. For example, the sensor(s) processor 325 can determine/calculate the clearance between the stator and rotor of the engine based on the sensor data from the engine sensor(s) 315. In this example, the sensor(s) processor 325 compares the clearance calculation from the sensor data to the target clearance scheduled for the operating conditions by the controller 310 for the clearance measurement to determine a change in clearance is warranted. In some examples, the sensor(s) processor 325 determines if the clearance between the case and the rotating parts is decreasing based on the comparison between the clearance calculation and the target clearance. If the sensor(s) processor 325 determines that the clearance between the case the rotating parts is not decreasing, then the program 1500 continues to block 1525 at which the sensor(s) processor 325 determines if there is exhaust gas temperature overshoot. If the sensor(s) processor 325 determines that the clearance between the case and the rotating parts is decreasing, then the program 1500 continues to block 1530 at which the example flow rate controller 330 transmits a flow rate control signal to the valve between the mixer and the case cooler.

At block 1525, the sensor(s) processor 325 determines if there is exhaust gas temperature overshoot. In some examples, the sensor(s) processor 325 determines if there is exhaust gas temperature overshoot based on the engine conditions determined from the obtained flight condition data. For example, the sensor(s) processor 325 directly measurements an EGT sensors, which includes information about the exhaust gas temperature. If the sensor(s) processor 325 determines that there is exhaust gas temperature overshoot, then program 1500 continues to block 1530 (e.g., the HP turbine 118 case) at which the flow rate controller 330 transmits a flow rate control signal to the valve between the mixer and the case cooler. If the sensor(s) processor 325 determines that there is no exhaust gas temperature overshoot, then program 1500 returns to block 1510 at which the sensor(s) processor 325 obtains the sensor data.

At block 1530, the flow rate controller 330 transmits a flow rate control signal to the valve 550 between the mixer 525 and the HPT case cooler/deflector 530 of FIG. 5. In some examples, the flow rate control signal causes the valve 550 to open and close to modulate/regulate the airflow rate between the mixer 525 and the HPT case cooler/deflector 530. In some examples, the valve 550 is opened and closed in variable positions. For example, the valve 550 can be opened and closed into positions ranging from 0% to 100% to meet the target clearance. In some examples, if the difference between the calculated clearance and the target clearance is large, the flow rate control signal causes the valve 550 to open and close quickly to decrease the difference to zero (e.g., no difference between the calculate clearance and target clearance). In some examples, if the difference between the calculated clearance and the target clearance is small, the flow rate control signal causes the valve 550 to open and close slowly to decreases the difference to zero. In some examples, the controller 310 causes a lag time (e.g., the time for the controller 310 to transmit the flow rate control signal to the valve 550). In the illustrated example, the flow rate controller 330 transmits a flow rate control signal to the valve 550 that increases the airflow rate between the mixer 525 and the HPT case cooler/deflector 530. The increase in airflow rate increases the amount of cooling air to the HPT case cooler/deflector 530, which provides more cooling air to the ACC system to decrease the clearance in response to an increase in clearance between the case and the rotating parts or an EGT overshoot.

At block 1535, the flow rate controller 330 transmits a flow rate control signal to the valve 560 between the HPT case cooler/deflector 530 and the case cooling (e.g., the LPT case cooler/deflector 540) of FIG. 5. In some examples, the flow rate control signal causes the valve 560 to open and close to modulate/regulate the airflow rate between the HPT case cooler/deflector 530 and the LPT case cooler/deflector 540. In the illustrated example, the flow rate controller 330 transmits a flow rate control signal to the valve 550 that increases the airflow rate between the HPT case cooler/deflector 530 and the LPT case cooler/deflector 540. The increase in airflow rate increases the amount of cooling air to the LPT case cooler/deflector 540, which decreases the clearance in response to an increase in clearance between the case and the rotating parts or an EGT overshoot.

At block 1540, the flow rate controller 330 transmits a flow rate control signal to the valve 555 between the mixer 525 and the rotating parts (e.g., the rotating parts cooler and clearance control 545) of FIG. 5. In some examples, the flow rate control signal causes the valve 555 to open and close to modulate/regulate the airflow rate between the mixer 525 and the rotating parts cooler and clearance control 545. In the illustrated example, the flow rate controller 330 transmits a flow rate control signal to the valve 555 that decreases the airflow rate between the mixer 525 and the rotating parts cooler and clearance control 545. The decrease in airflow rate decreases the amount of cooling air to the rotating parts cooler and clearance control 545, which provides less cooling air (than the baseline) to the CCA system to decrease the clearance in response to an increase in clearance between the case and the rotating parts or an EGT overshoot. In some examples, the cooling air is provided to the CCA system when the EGT measured from the EGT sensors is over or near an EGT limit (e.g., an EGT overshoot).

At block 1545, the example temperature controller 335 transmits a temperature control signal to the mixer 525. In some examples, the temperature control signal causes the mixer 525 to adjust/modulate the temperature of the cooling air in the mixer 525. In the illustrated example, the temperature controller 335 transmits a temperature control signal to the mixer 525 that decreases the temperature of the cooling air. The decrease in air temperature allows the cooling air to cool the components of the turbine engine faster, which can control clearance more effectively by cooling the case and the rotating parts in response to a change in clearance between the case and the rotating parts or an EGT overshoot. For example, applying cooling air to the case helps to decrease the clearance between the case and the rotating parts. In some examples, applying cooling air to the rotating parts (e.g., rotor) increases the clearance between the case and the rotating parts. Once the temperature controller 335 transmits the temperature control signal to the mixer 525, program 1500 ends. In some examples, program 1500 is a continuous loop where once the temperature controller 335 transmits the temperature control signal to the mixer 525, program 1500 returns to block 1510 at which the example sensor(s) processor 325 obtains the sensor data from the example engine sensor(s) 315.

Figure 16:
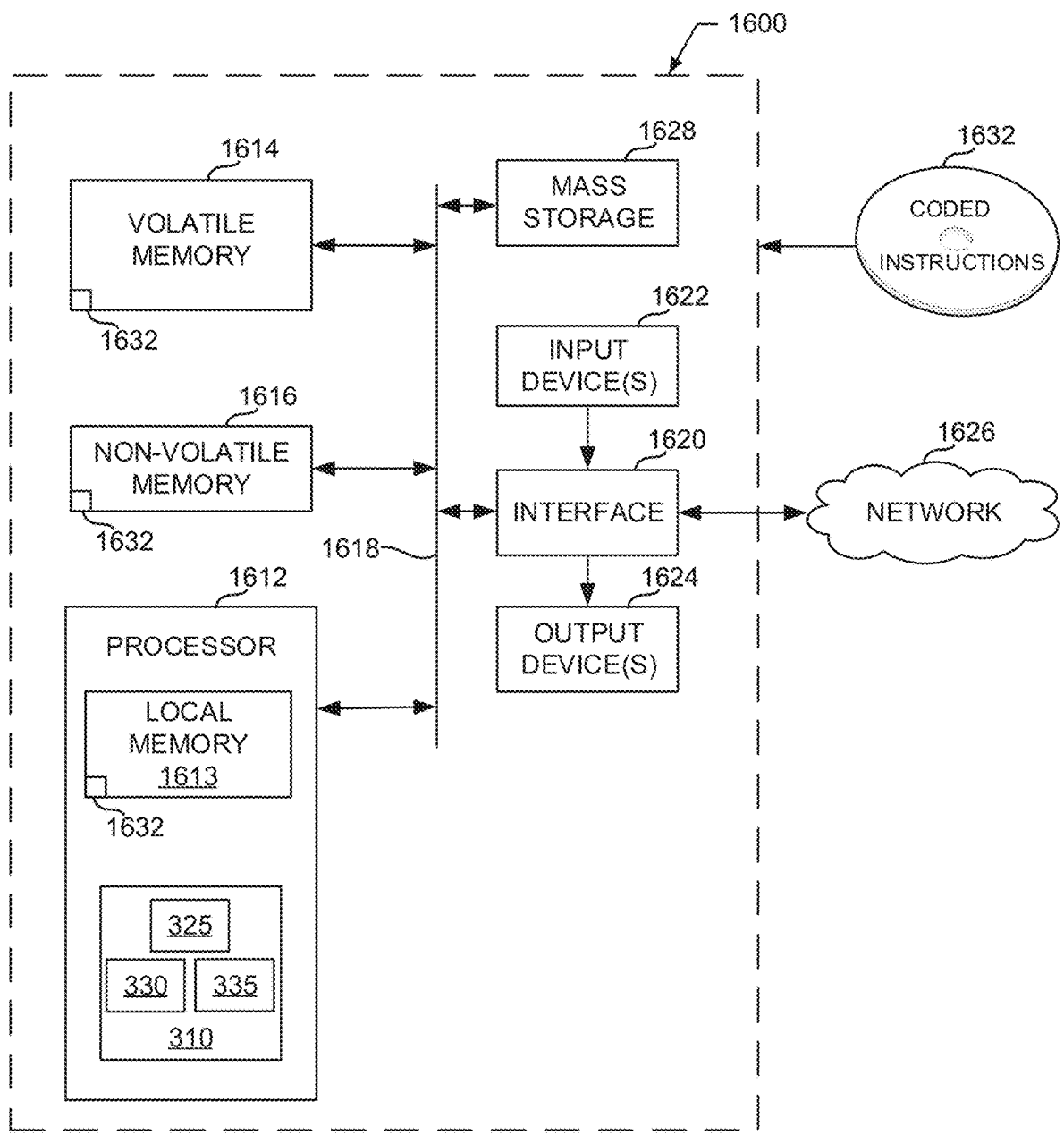
FIG. 16 is a block diagram of an example processing platform structured to execute the instructions of FIGS. 14, 15 to implement the example controller of FIG. 3.

FIG. 16 is a block diagram of an example processor platform 1600 structured to execute the instructions of FIGS. 14 and 15 to implement the example controller 310 of FIG. 3. The processor platform 1600 can be, for example, a server, a personal computer, a workstation, a self-learning machine (e.g., a neural network), a mobile device (e.g., a tablet such as an iPad™), or other wearable device, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor(s) processor 325, the example flow rate controller 330, and the example temperature controller 335.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

The machine executable instructions 1632 of FIGS. 14 and 15 may be stored in the mass storage device 1628, in the volatile memory 1614, in the non-volatile memory 1616, and/or on a removable non-transitory computer readable storage medium such as a CD or DVD.

From the foregoing, it will be appreciated that example methods, apparatus and articles of manufacture have been disclosed that illustrate a clearance design process and strategy with CCA-ACC optimization for EGT and performance improvement. The disclosed methods, apparatus and articles of manufacture propose an integrate CCA-ACC system that provides sufficient clearance control (e.g., power, airflow, cooling temperature adjustment, clearance precision, etc.) to control EGT overshoot during take-off and improved time-on-wing for the gas turbine engine. The disclosed examples use either a heat exchanger or a mixer to provide an exchange of cooling air between the CCA and ACC systems. The disclosed methods, apparatus and articles of manufacture provide appropriate clearance control for the gas turbine engine by achieving tighter clearance at cruise while improving specific fuel consumption (SFC) for the gas turbine engine. Furthermore, examples disclosed herein provide increased hardware endurance capability and life improvement for the components of the gas turbine.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Further aspects of the invention are provided by the subject matter of the following clauses:

1. An apparatus for clearance control in a turbine engine, the apparatus comprising: a case surrounding at least part of the turbine engine, the at least part of the turbine engine including a turbine or a compressor; a first source to obtain external air, the first source including at least one of a low pressure compressor, a fan, or a booster; a second source to obtain cooled cooling air, the second source including at least one of a low pressure compressor or a high pressure compressor; a heat exchanger to control a temperature of the cooled cooling air provided by the second source, the heat exchanger triggered by a first control signal; and a case cooler to provide active clearance control air to the case to control deflection of the case, wherein the active clearance control air is a combination of the external air from the first source and the cooled cooling air, the case cooler coupled to the heat exchanger using a first valve, the first valve triggered by a second control signal.

2. The apparatus of any preceding clause, wherein the heat exchanger provides cooled cooling air to rotating parts within the case to control a temperature of the rotating parts to adjust clearance between rotor and the case.

3. The apparatus of any preceding clause, wherein the heat exchanger provides cooled cooling air to the case cooler to control a temperature of the case to adjust clearance between rotor and the case.

4. The apparatus of any preceding clause, wherein the first source is coupled to the case cooler using a second valve, the second valve triggered by a third control signal.

5. The apparatus of any preceding clause, wherein the case cooler is a first case cooler, and the case cooler outputs the active clearance control air to a second case cooler using a third valve, and the heat exchanger outputs the cooled cooling air to the rotating parts using a fourth valve, the third valve triggered by a fourth control signal, and the fourth valve triggered by a fifth control signal.

6. The apparatus of any preceding clause, the apparatus further including a controller to monitor conditions using sensors in the at least part of turbine engine, wherein the conditions include temperature, pressure, other cycle parameters, direct clearance measurements, and indirect clearance measurements.

7. The apparatus of any preceding clause, wherein the controller is to regulate inputs and outputs of the case cooler and outputs of the heat exchanger in response to the conditions, the controller to transmit the first control signal, the second control signal, the third control signal, the fourth control signal, and the fifth control signal in response to the conditions.

8. The apparatus of any preceding clause, wherein the first control signal is to adjust the temperature of the cooled cooling air in the heat exchanger, and wherein the second control signal, the third control signal, the fourth control signal, and the fifth control signal are to regulate airflow through the first valve, the second valve, the third valve, and the fourth valve respectively.

9. An apparatus for clearance control in a turbine engine, the apparatus comprising: a case surrounding at least part of the turbine engine, the at least part of the turbine engine including a turbine or a compressor; a first source to obtain external air, the first source including at least one of a low pressure compressor, a fan, or a booster; a second source to obtain cooled cooling air, the second source including at least one of a low pressure compressor or a high pressure compressor; a mixer to generate thermally mixed air by mixing the external air provided by the first source and the cooled cooling air provided by the second source, the mixer to regulate a temperature of the thermally mixed air, the mixer triggered by a first control signal; and a case cooler to provide the thermally mixed air from the mixer to the case to control deflection of the case, the case cooler coupled to the mixer using a first valve, the first valve triggered by a second control signal.

10. The apparatus of any preceding clause, wherein the mixer provides thermally mixed air to rotating parts within the case to increase clearance between the rotating parts and the case, the mixer coupled to the rotating parts using a second valve, the second valve triggered by a third control signal.

11. The apparatus of any preceding clause, wherein the case cooler is a first case cooler, and the case cooler outputs the thermally mixed air to a second case cooler using a third valve, the third valve triggered by a fourth control signal.

12. The apparatus of any preceding clause, the apparatus further including a controller to monitor conditions using sensors in the at least part of the turbine engine, wherein the conditions include temperature, pressure, other cycle parameters, direct clearance measurements, and indirect clearance measurements.

13. The apparatus of any preceding clause, wherein the controller is to regulate outputs of the mixer and output of the case cooler in response to the conditions, the controller to transmit the first control signal, the second control signal, the third control signal, and the fourth control signal.

14. The apparatus of any preceding clause, wherein the first control signal is to adjust the temperature of the cooled cooling air in the mixer, and wherein the second control signal, the third control signal, and the fourth control signal are to regulate airflow through the first valve, the second valve, and the third valve respectively.

15. A non-transitory computer readable medium comprising instructions that, when executed, cause at least one processor to at least obtain condition parameters from sensor devices in a turbine engine, monitor the condition parameters, determine when conditions indicate an increase in temperature or a decrease in clearance between a blade tip and a case, the case surrounding at least part of the turbine engine, in response to determining that the conditions indicate an increase in temperature or a decrease in clearance between the blade tip and the case transmit a first control signal to adjust a flow rate of a valve to increase airflow, and transmit a second control signal to adjust temperature of airflow through the at least part of the turbine engine.

16. The non-transitory computer readable medium of any preceding clause, wherein the at least part of the turbine engine includes a turbine or a compressor.

17. The non-transitory computer readable medium of any preceding clause, wherein the condition parameters include temperature measurements, pressure measurements, or air density measurements.

18. The non-transitory computer readable medium of any preceding clause, wherein the instructions that, when executed, cause the at least one processor to adjust the temperature of airflow through the at least part of the turbine engine using a heat exchanger or a mixer.

19. The non-transitory computer readable medium of any preceding clause, wherein the instructions that, when executed, cause the at least one processor is to monitor the condition parameters by comparing the condition parameters from the sensor devices to condition model estimates.

20. The non-transitory computer readable medium of any preceding clause, wherein the instructions that, when executed, cause the at least one processor to determine when conditions indicate an exhaust gas temperature overshoot, and in response to determining that the conditions indicate exhaust gas temperature overshoot transmit the first control signal to adjust the flow rate of the valve to increase airflow, and transmit the second control signal to adjust the temperature of the airflow through the at least part of the turbine engine.

21. An engine controller comprising: a memory; and a processor coupled to the memory, the memory including instructions that, when executed, cause the processor to at least: obtain condition parameters from sensor devices in a turbine engine; monitor the condition parameters; determine when conditions indicate an increase in temperature or a decrease in clearance between a blade tip and a case, the case surrounding at least part of the turbine engine; in response to determining that the conditions indicate an increase in temperature or a decrease in clearance between the blade tip and the case: transmit a first control signal to adjust a flow rate of a valve to increase airflow; and transmit a second control signal to adjust temperature of airflow through the at least part of the turbine engine.

What is claimed is:

1. A non-transitory computer readable medium comprising instructions that, when executed, cause at least one processor to at least:
obtain condition parameters from sensor devices in a turbine engine;
monitor the condition parameters;
determine when the condition parameters indicate an increase in temperature or a decrease in clearance between a blade tip and a case, the case surrounding at least part of the turbine engine;
in response to determining that the condition parameters indicate an increase in temperature or a decrease in clearance between the blade tip and the case:
transmit a first control signal to adjust a flow rate of a first valve to increase airflow in a first case cooler;
transmit a second control signal to adjust temperature of the airflow through the at least part of the turbine engine; and
transmit a third control signal to trigger a second valve to mix external air in the airflow; and
transmit a fourth control signal to trigger a third valve to route a portion of the airflow to a second case cooler.

2. The non-transitory computer readable medium of claim 1, wherein the at least part of the turbine engine includes a turbine or a compressor.

3. The non-transitory computer readable medium of claim 1, wherein the condition parameters include at least one of temperature measurements, pressure measurements, or air density measurements.

4. The non-transitory computer readable medium of claim 1, wherein the instructions, when executed, cause the at least one processor to adjust the temperature of the airflow through the at least part of the turbine engine using a heat exchanger or a mixer.

5. The non-transitory computer readable medium of claim 1, wherein the instructions, when executed, cause the at least one processor to monitor the condition parameters by comparing the condition parameters from the sensor devices to condition model estimates.

6. The non-transitory computer readable medium of claim 1, wherein the instructions, when executed, cause the at least one processor to:
determine when condition parameters indicate an exhaust gas temperature overshoot; and
in response to determining that the condition parameters indicate the exhaust gas temperature overshoot:
transmit the first control signal to adjust the flow rate of the valve to increase the airflow; and
transmit the second control signal to adjust the temperature of the airflow through the at least part of the turbine engine.

7. The non-transitory computer readable medium of claim 1, wherein the instructions, when executed, cause the at least one processor to:
combine external air with cooled cooling air to form the airflow.

8. A method comprising:
obtaining condition parameters from sensor devices in a turbine engine;
monitoring the condition parameters;
determining when the condition parameters indicate an increase in temperature or a decrease in clearance between a blade tip and a case, the case surrounding at least part of the turbine engine;
in response to determining that the condition parameters indicate an increase in temperature or a decrease in clearance between the blade tip and the case:
transmitting a first control signal to adjust a flow rate of a first valve to increase airflow in a first case cooler;
transmitting a second control signal to adjust temperature of the airflow through the at least part of the turbine engine; and
transmitting a third control signal to trigger a second valve to mix external air in the airflow; and
transmitting a fourth control signal to trigger a third valve to route a portion of the airflow to a second case cooler.

9. The method of claim 8, wherein the at least part of the turbine engine includes a turbine or a compressor.

10. The method of claim 8, wherein the condition parameters include at least one of temperature measurements, pressure measurements, or air density measurements.

11. The method of claim 8, further including adjusting the temperature of the airflow through the at least part of the turbine engine using a heat exchanger or a mixer.

12. The method of claim 8, further including monitoring the condition parameters by comparing the condition parameters from the sensor devices to condition model estimates.

13. The method of claim 8, further including:
determining when condition parameters indicate an exhaust gas temperature overshoot; and
in response to determining that the condition parameters indicate the exhaust gas temperature overshoot:
transmitting the first control signal to adjust the flow rate of the valve to increase the airflow; and
transmitting the second control signal to adjust the temperature of the airflow through the at least part of the turbine engine.

* * * * *